US008447183B2

(12) United States Patent
Boduch et al.

(10) Patent No.: US 8,447,183 B2
(45) Date of Patent: May 21, 2013

(54) METHODS AND APPARATUS FOR PERFORMING DIRECTIONLESS AND CONTENTIONLESS WAVELENGTH ADDITION AND SUBTRACTION

(75) Inventors: Mark E. Boduch, Geneva, IL (US); Kimon Papakos, Chicago, IL (US); Yajun Wang, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 698 days.

(21) Appl. No.: 12/583,764

(22) Filed: Aug. 25, 2009

(65) Prior Publication Data

US 2010/0272441 A1 Oct. 28, 2010

Related U.S. Application Data

(60) Provisional application No. 61/172,530, filed on Apr. 24, 2009, provisional application No. 61/173,516, filed on Apr. 28, 2009, provisional application No. 61/220,498, filed on Jun. 25, 2009, provisional application No. 61/269,584, filed on Jun. 27, 2009.

(51) Int. Cl.
*H04J 14/02* (2006.01)

(52) U.S. Cl.
USPC .............................................. 398/83; 398/85

(58) Field of Classification Search
USPC ...................................................... 398/83–85
See application file for complete search history.

(56) References Cited

U.S. PATENT DOCUMENTS 7,072,580 B2 7/2006 Arecco et al.
7,437,075 B2 10/2008 Doerr et al.
7,620,321 B2 11/2009 Miura et al.
7,751,714 B2 * 7/2010 Zhong et al. .................... 398/83
7,995,921 B2 8/2011 Grubb (Continued)

FOREIGN PATENT DOCUMENTS

EP 1 349 309 A2 10/2003
EP 1 628 424 A2 2/2006

OTHER PUBLICATIONS

S. Thiagarajan, L. Blair, and J. Berthold, Direction-Independent Add/Drop Access for Multi-Degree ROADMs, in Optical Fiber Communication Conference and Exposition and The National Fiber Optic Engineers Conference, OSA Technical Digest, Optical Society of America, Feb. 24, 2008.*

(Continued)

*Primary Examiner* — Nathan Curs
(74) *Attorney, Agent, or Firm* — Hamilton, Brook, Smith & Reynolds, P.C.

(57) ABSTRACT

In today's reconfigurable optical add/drop multiplexer (ROADM) based optical node, ROADMs multiplex (and demultiplex) colored optical signals to form wavelength-division multiplexed (WDM) signals. Transponders connected to the ROADMs' add/drop ports convert noncolored optical signals to colored optical signals (and vice versa). Dedicating transponders to given ports degrades the node's ability to route around network failures. Example embodiments of the invention include an optical node and corresponding method for routing optical signals within an optical node that compensate for this inflexibility. The optical node may include two ROADMs to transmit respective WDM signals onto at least two internode network paths and a routing module that can direct channels of the same wavelength along different internode network paths. Advantageously, a transponder may transmit (receive) different signals at the same wavelength to (from) different network node interfaces within the optical node, thereby improving the optical node's ability to route around network failures.

29 Claims, 27 Drawing Sheets

U.S. PATENT DOCUMENTS

| | | | |
|---|---|---|---|
| 8,009,986 | B2 | 8/2011 | Chang et al. |
| 8,165,468 | B2 | 4/2012 | Boduch et al. |
| 2002/0101636 | A1* | 8/2002 | Xiao et al. ............... 359/127 |
| 2006/0133804 | A1 | 6/2006 | Boduch et al. |
| 2006/0210274 | A1* | 9/2006 | Lichtman et al. ........... 398/83 |
| 2008/0069123 | A1 | 3/2008 | Nagata et al. |
| 2008/0118245 | A1 | 5/2008 | Chang et al. |
| 2008/0131130 | A1* | 6/2008 | Chang et al. ............... 398/83 |
| 2008/0260386 | A1 | 10/2008 | Boduch et al. |
| 2009/0067845 | A1 | 3/2009 | Zhong et al. |
| 2009/0180779 | A1* | 7/2009 | Boduch et al. ............. 398/83 |
| 2010/0272441 | A1 | 10/2010 | Boduch et al. |
| 2011/0038636 | A1* | 2/2011 | Akiyama et al. ........... 398/85 |

OTHER PUBLICATIONS

Notification of Transmittal of the International Search Report and the Written Opinion of the International Searching Authority, or the Declaration, for PCT/US2010/031233, mailed Jul. 22, 2010, 12 pages.

Enablence Optical Components & Subsystems, "iMS™ NxM Expandable Multicast Switch Module" (2008).

Notification of Transmittal of the International Search Report and the Written Opinion of the International Searching Authority, or the Declaration, for PCT/US2009/000193, mailed on May 5, 2009.

Kaman, V., et al., "Comparison of Wavelength-Selective Cross-Connect Architectures for Reconfigurable All-Optical Networks," *PS'2006—Photonics in Switching Conference*, pp. 1-3; (Oct. 2006).

Kaman, V., et al., "Multi-Degree ROADM's with Agile Add-Drop Access," pp. 31-32, (Aug. 2007).

"Media for Lightwave", [online], PenWell Corporation, Dec. 2008, [retrieved on Feb. 9, 2009]. Retrieved from the Internet URL: http://lw.pennnet.com/Articles/Article_Display.cfm?ARTICLE_ID=252957&p=13&dcmp=LWDENL_ARCH.

"Who Makes What: ROADMs", *Light Reading*, CMP Media LLC, Jul. 26, 2004.

Roorda, P., et al., "Evolution to Colorless and Directionless ROADM Architectures," Paper presented at the Optical Fiber Communication Conference and Exposition and the National Fiber Optic Engineers Conference (OFC/NFOEC 2008), (Feb. 2008).

Notification Concerning Transmittal of International Preliminary Report on Patentability (Chapter I of the Patent Cooperation Treaty), for PCT/US2010/031233, mailed on Apr. 15, 2010.

\* cited by examiner

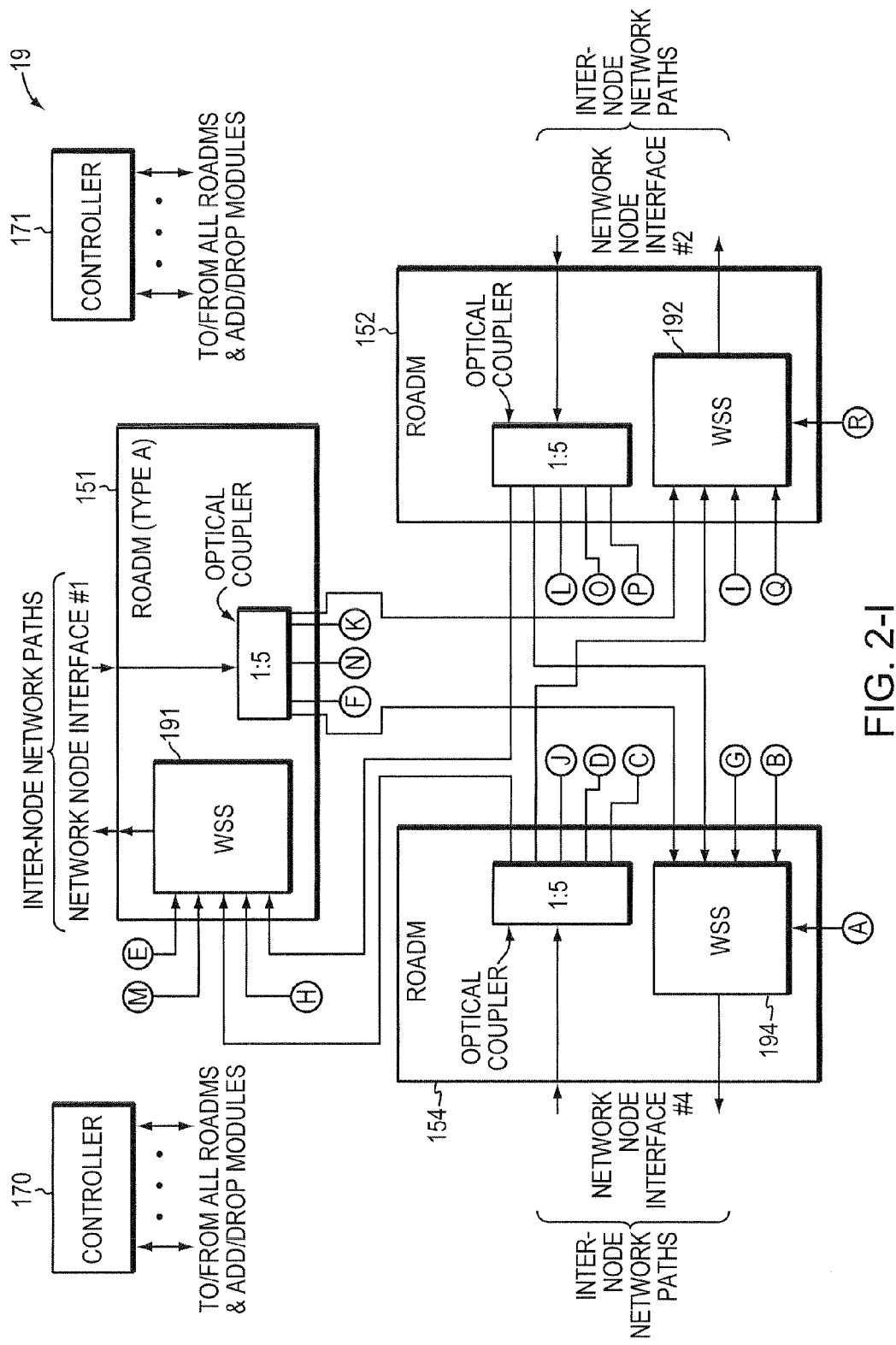
FIG. 2-I

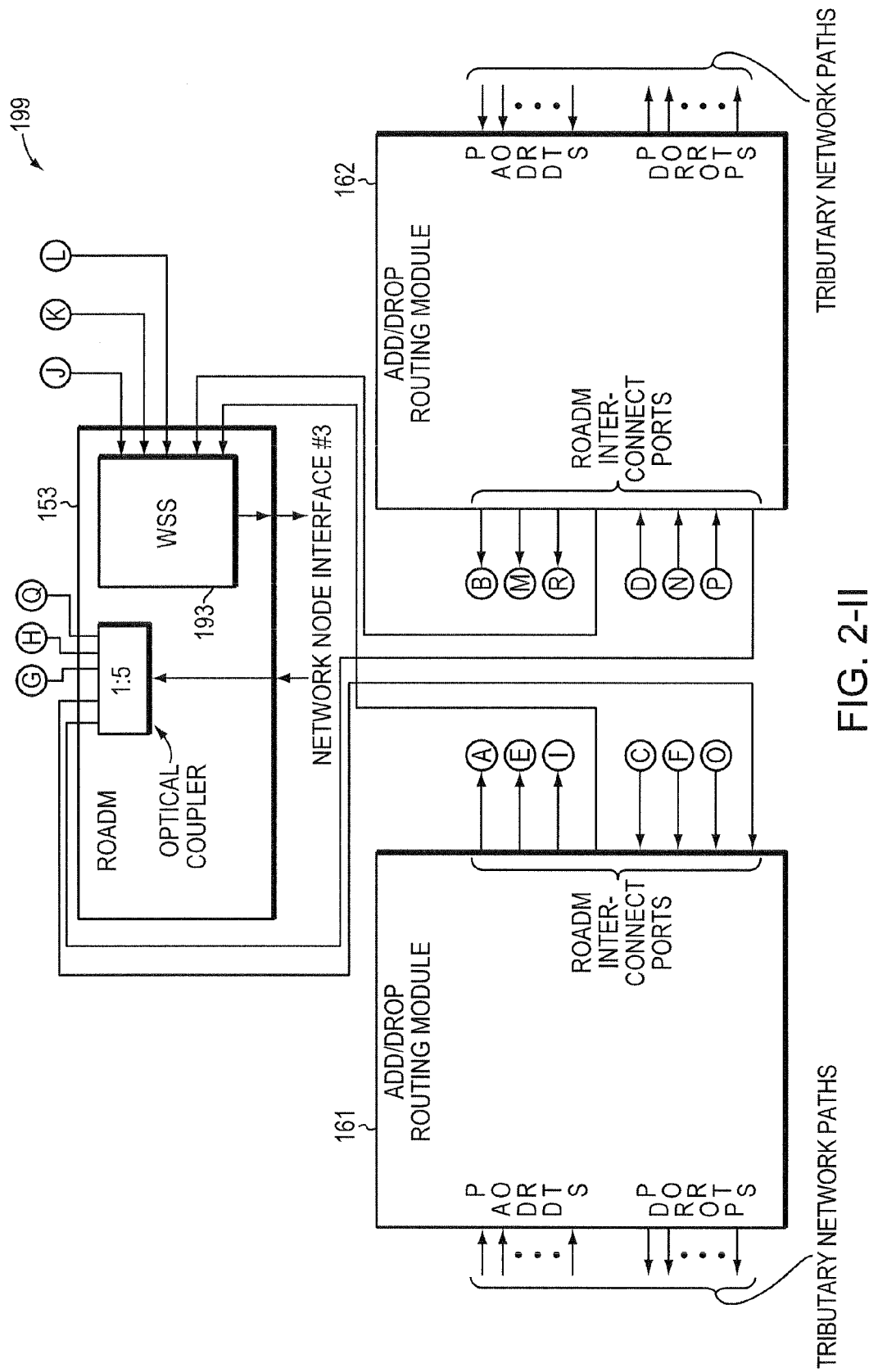
FIG. 2-II

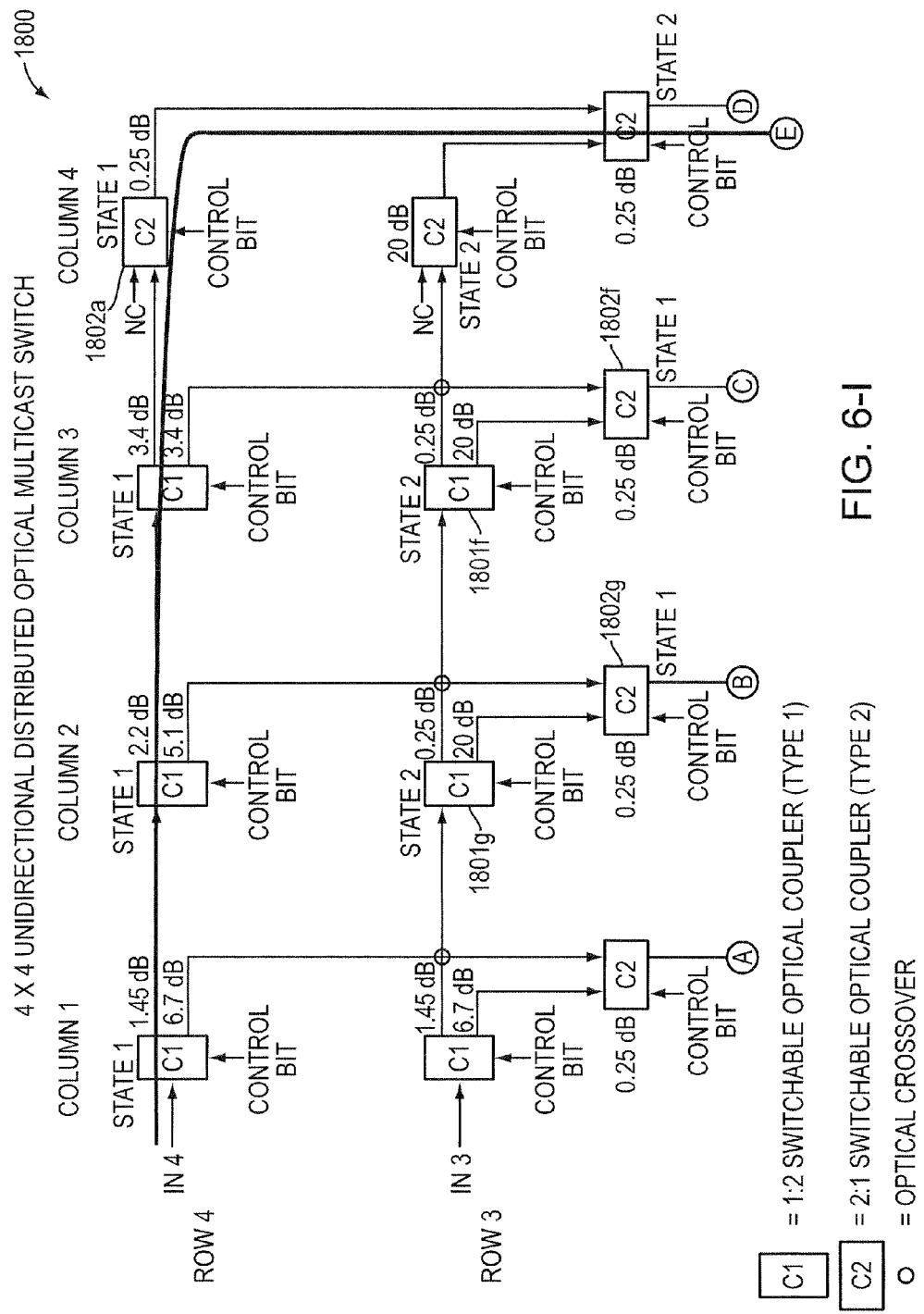
FIG. 6-I

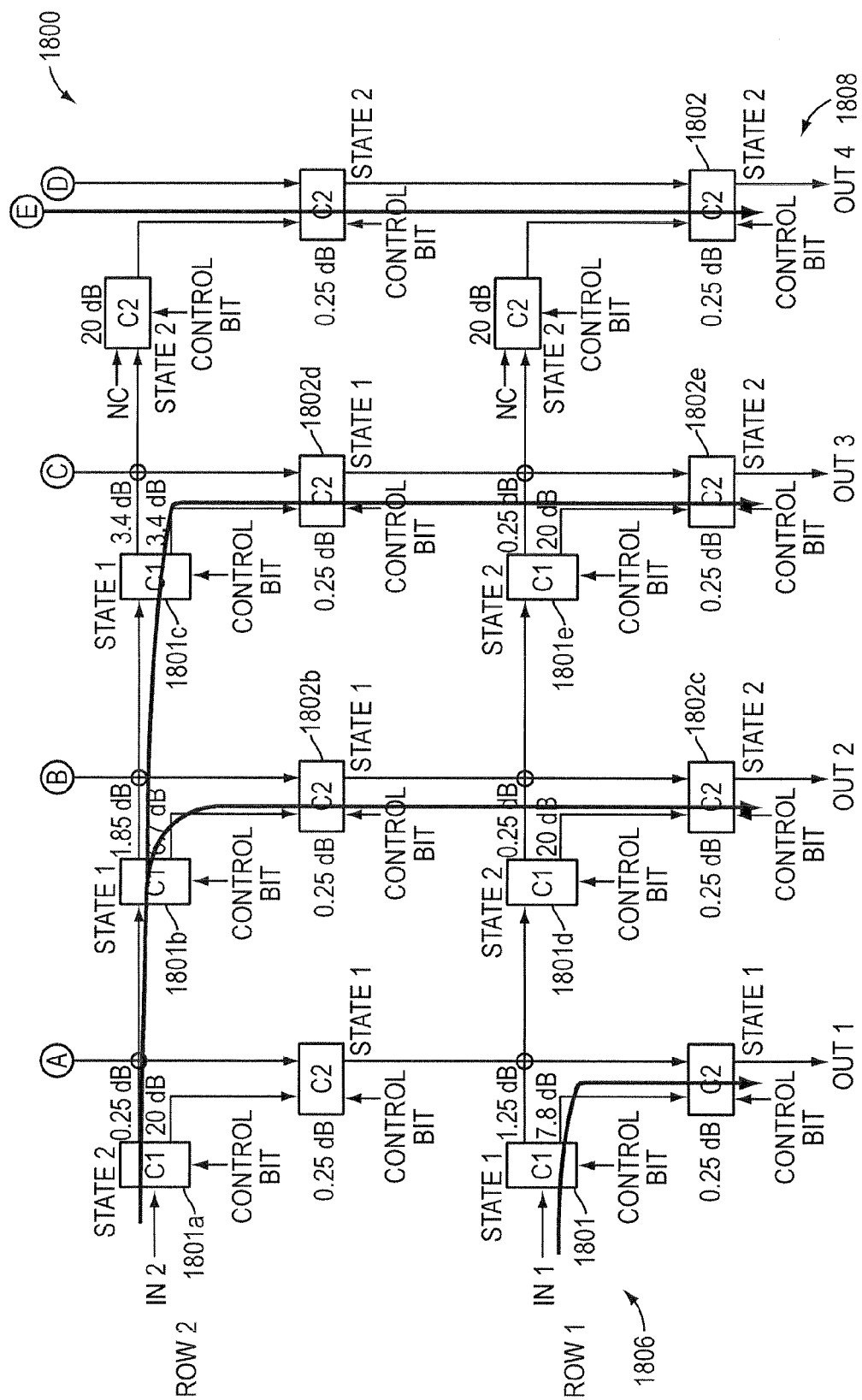
FIG. 6-II

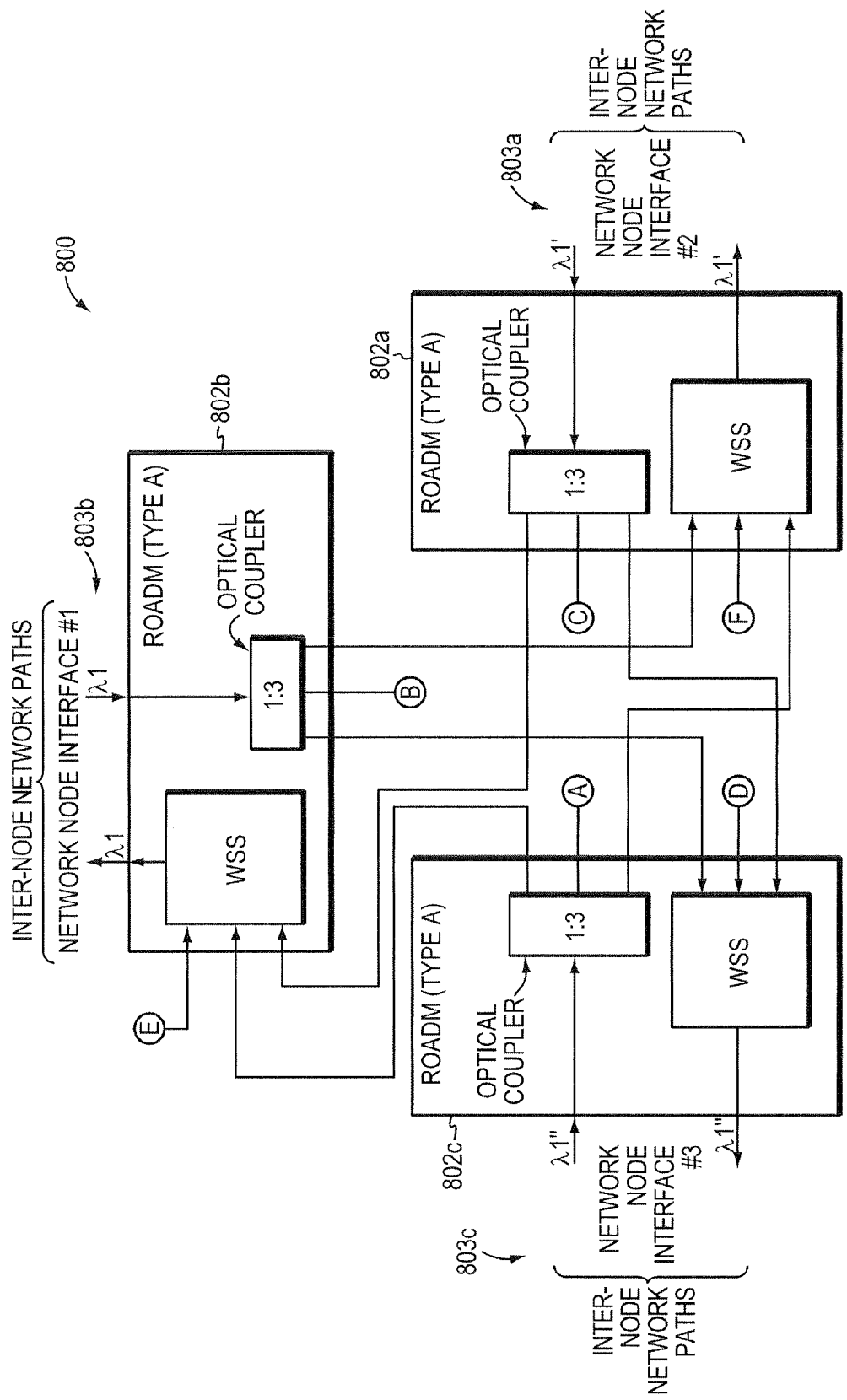
FIG. 9A-I

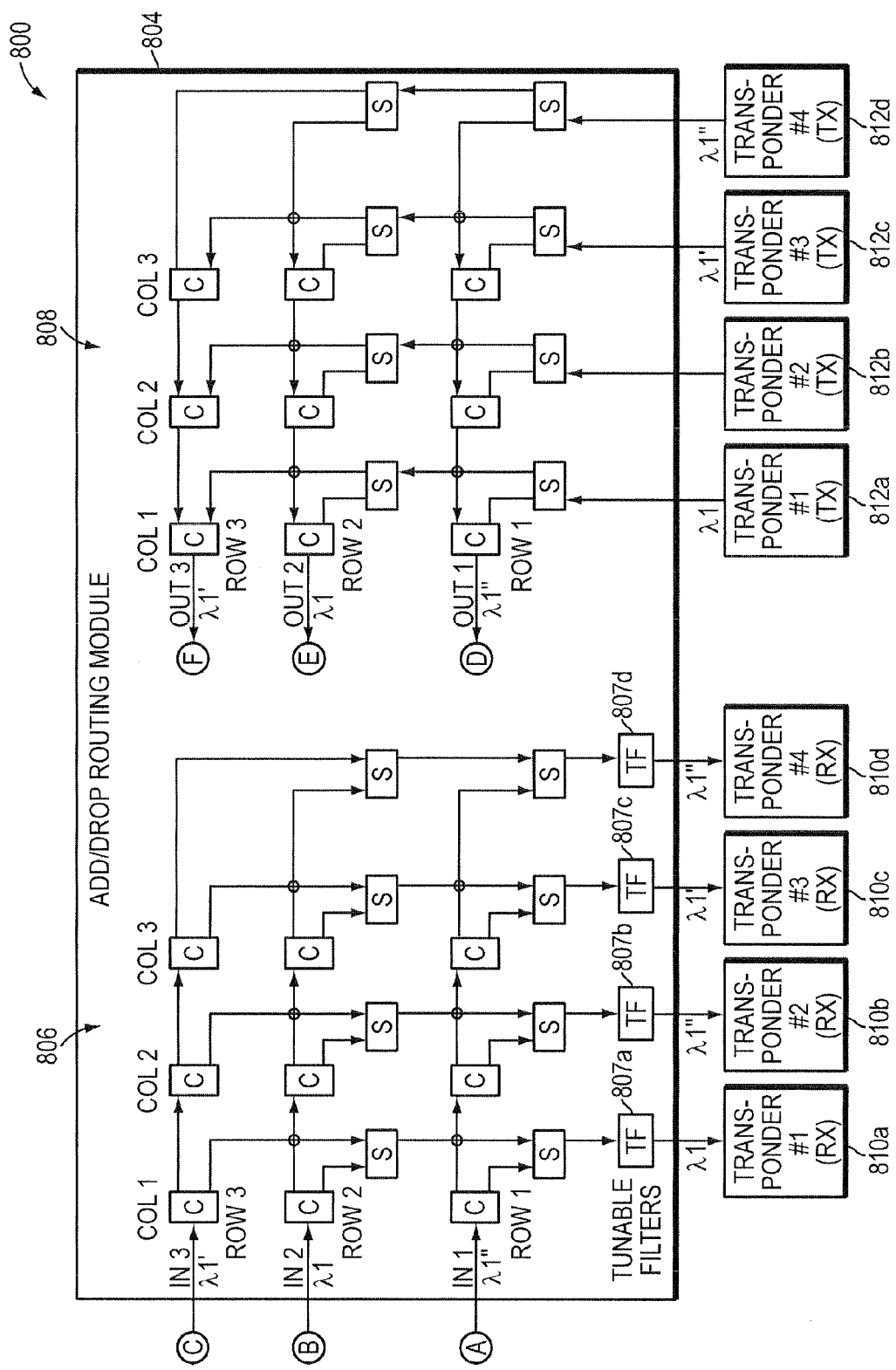
FIG. 9A-II

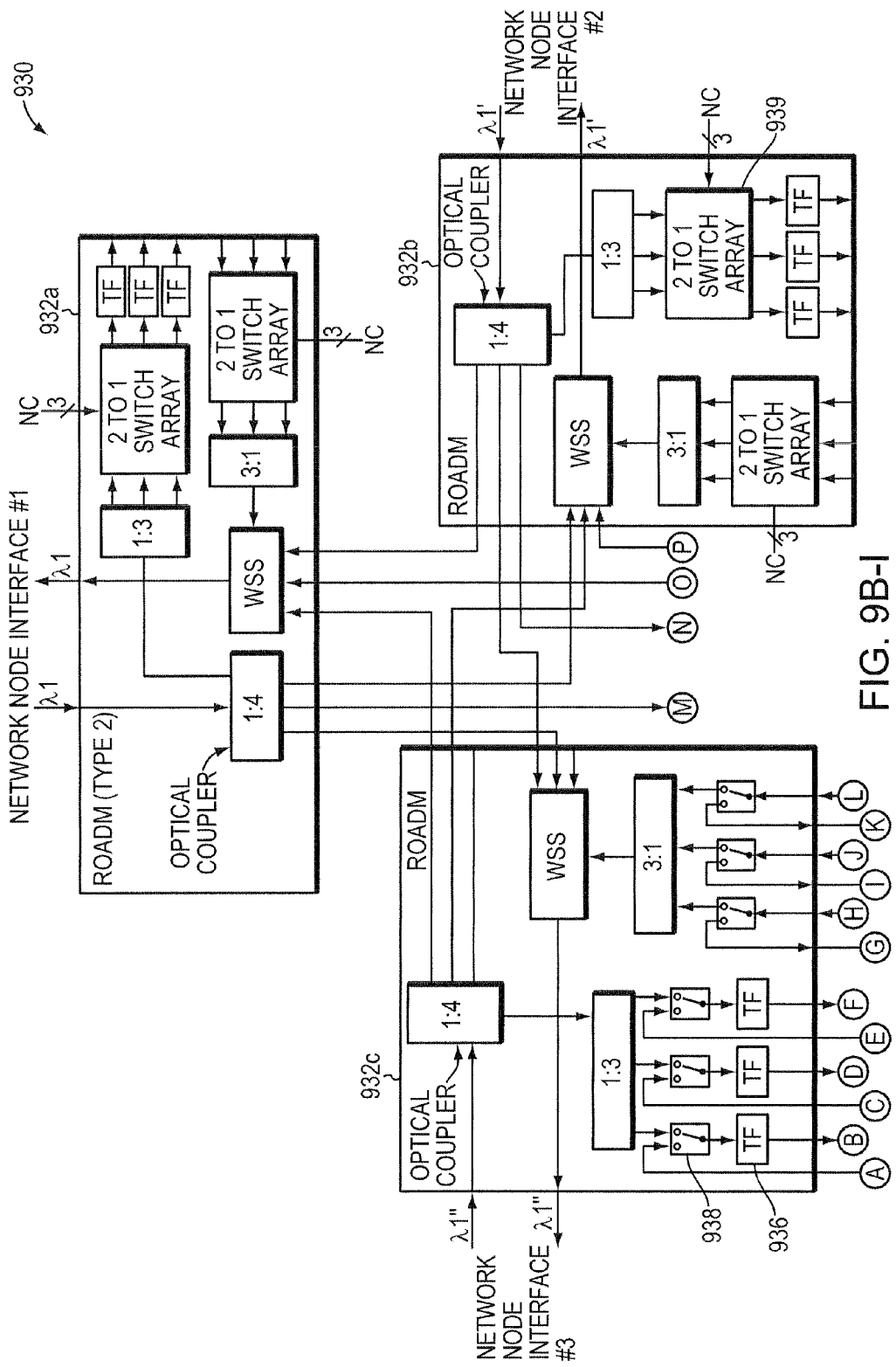
FIG. 9B-I

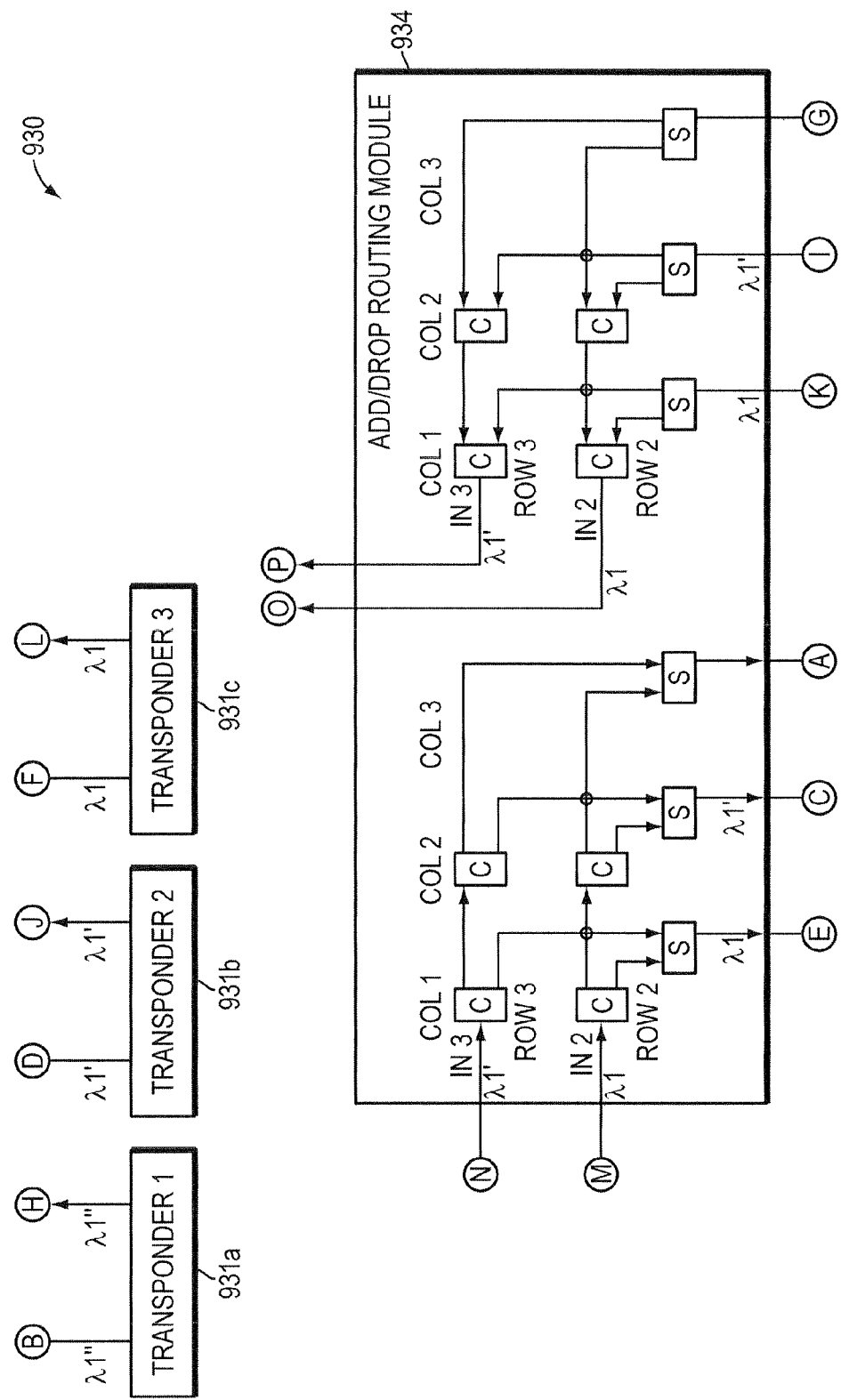
FIG. 9B-II

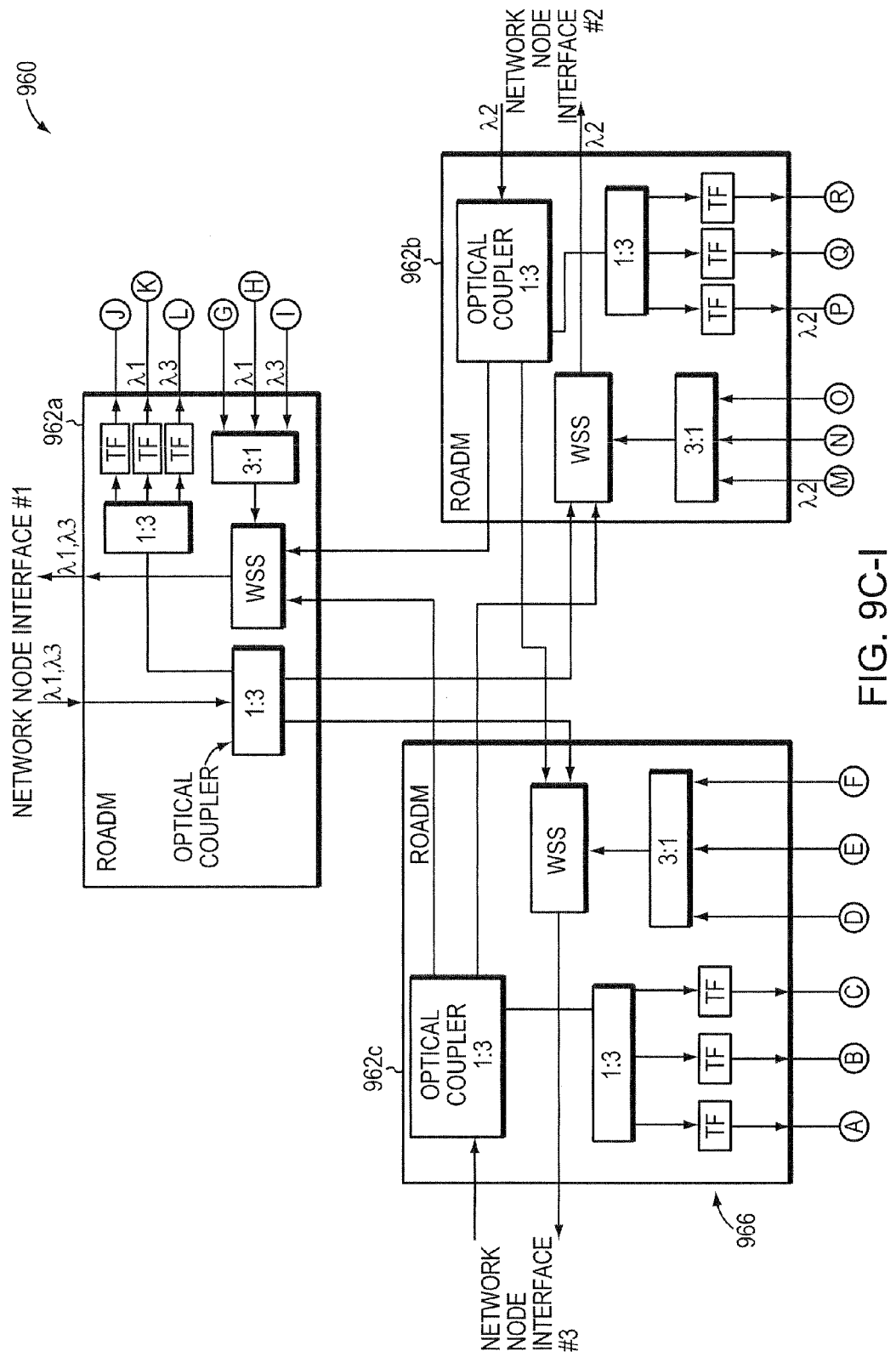
FIG. 9C-I

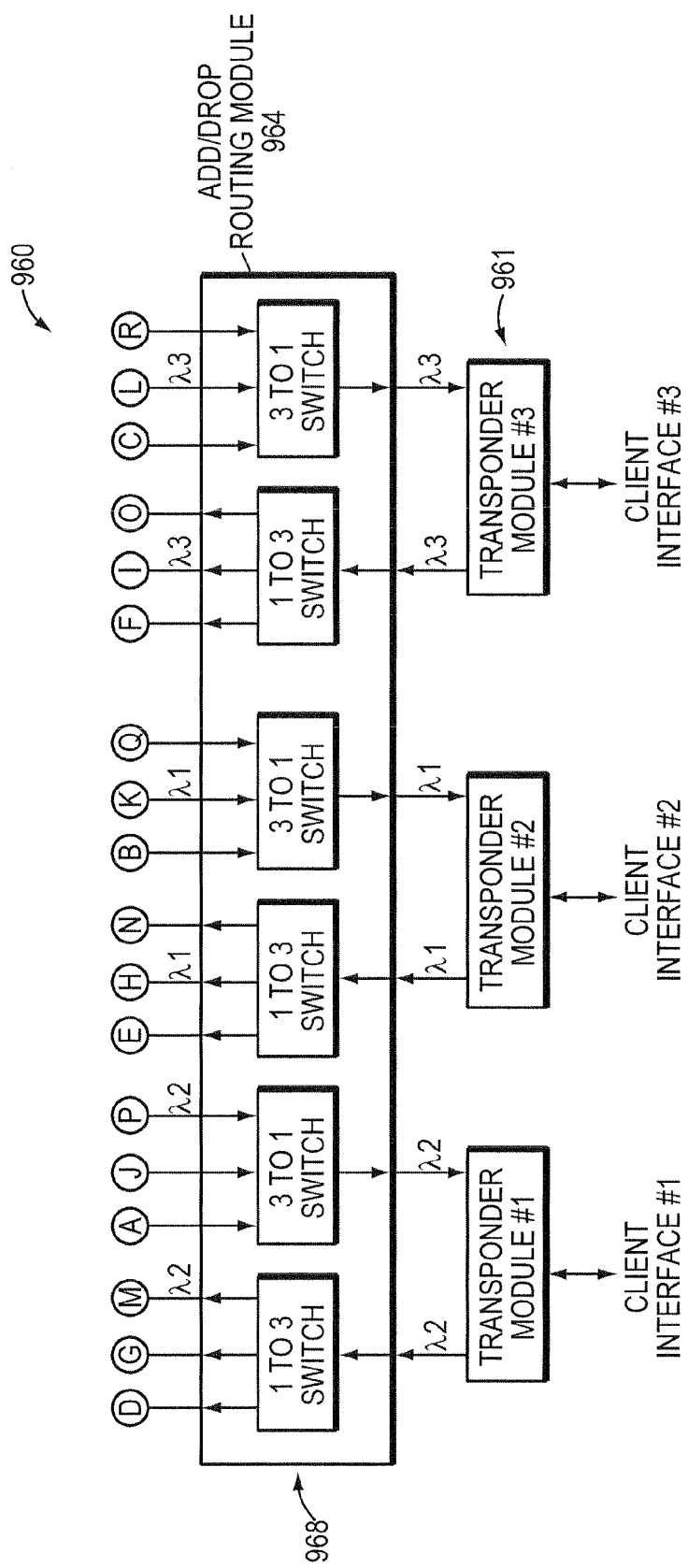
FIG. 9C-II

METHODS AND APPARATUS FOR PERFORMING DIRECTIONLESS AND CONTENTIONLESS WAVELENGTH ADDITION AND SUBTRACTION

RELATED APPLICATIONS

This application claims the benefit of U.S. Provisional Application No. 61/172,530, filed Apr. 24, 2009; of U.S. Provisional Application No. 61/173,516, filed Apr. 28, 2009; of U.S. Provisional Application No. 61/220,498, filed Jun. 25, 2009; and of U.S. Provisional Application No. 61/269,584, filed Jun. 27, 2009. The entire teachings of the above applications are incorporated herein by reference.

BACKGROUND OF THE INVENTION

In existing reconfigurable optical add-drop multiplexer (ROADM) based optical nodes, a set of add ports and a set of drop ports are dedicated to a given output network node interface. Attached to the given add/drop port is an optical transponder. The optical transponder provides an ability to convert a "white light," non-colored optical signal to a colored optical signal (and vice versa). The ROADM then provides an ability to multiplex multiple colored optical signals into a single multi-wavelength dense wavelength division multiplexed (DWDM) optical signal. When dedicating a given transponder to a given network node interface, there can be corresponding inflexibility at the network level in the presence of network failures (e.g., fiber failures and node failures). This inflexibility can occur in so called "mesh networks."

SUMMARY OF THE INVENTION

Embodiments of the present invention include an optical node (and method for routing wavelength division multiplexed (WDM) using an optical node) comprising at least two reconfigurable optical add/drop multiplexers (ROADMs) and a routing module. The ROADMs may be configured to transmit respective WDM signals, each of which may include multiple channels of different wavelengths, onto at least two internode network paths. The routing module may be configured to direct channels of the same wavelength to different internode network paths via the ROADMs.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2-I and 2-II are block diagrams of a network node employing an example embodiment of the present invention.

FIGS. 6-I and 6-II are block diagrams of a unidirectional distributed multicast switch that uses switchable optical couplers according to an example embodiment of the present invention.

FIGS. 9A-I and 9A-II are block diagrams of a network node containing an add/drop routing module according to an example embodiment of the present invention.

FIGS. 9B-I and 9B-II are block diagrams is a block diagram of an alternative optical node according to an example embodiment of the present invention.

FIGS. 9C-I and 9C-II are block diagrams of another alternative optical node according to embodiments of the present invention.

DETAILED DESCRIPTION OF THE INVENTION

Figure 1:
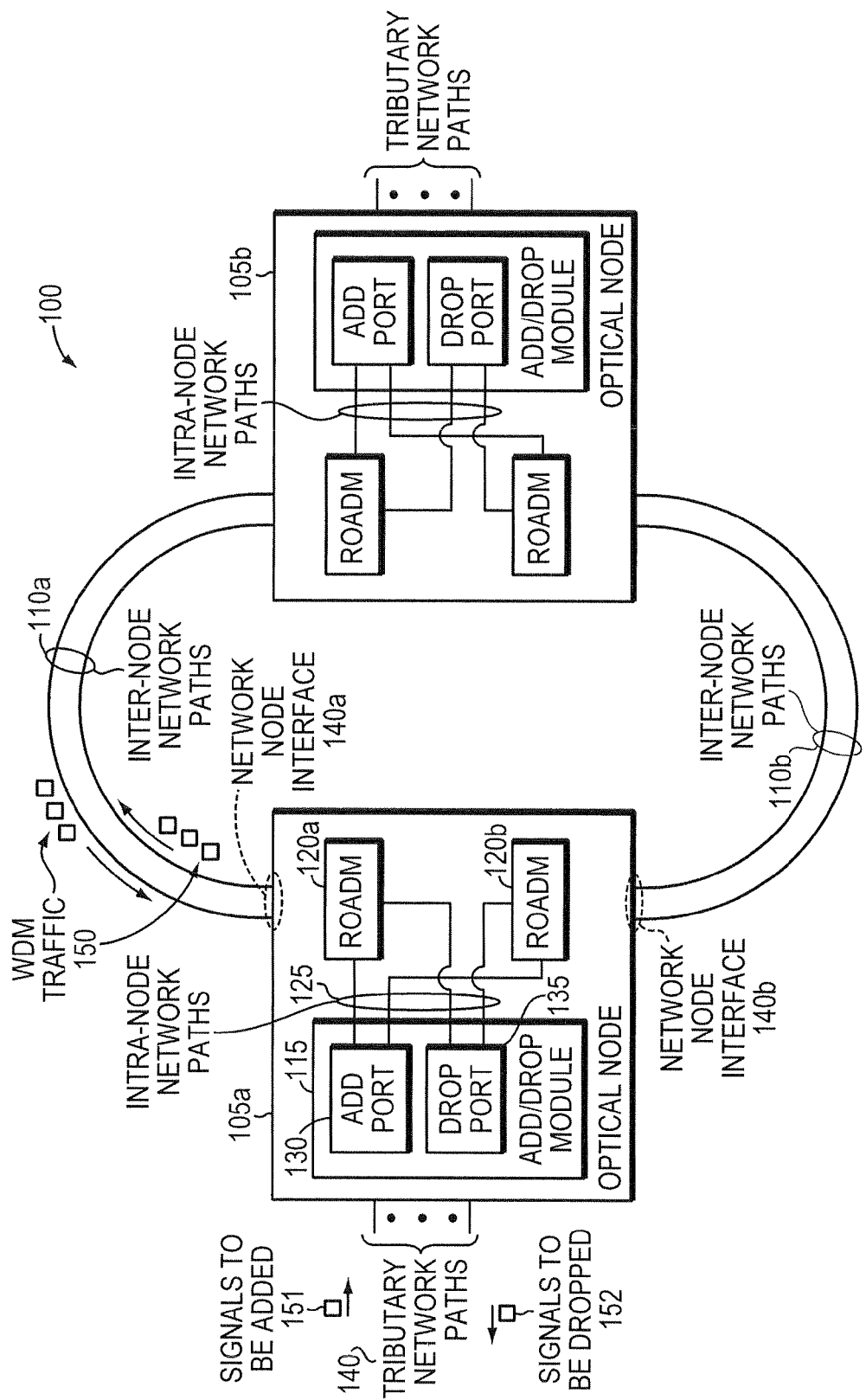
FIG. 1 is a block diagram of a network employing an example embodiment of the present invention.

A description of example embodiments of the invention follows.

The present application incorporates by reference the contents of U.S. patent application Ser. No. 11/697,527, entitled "MULTIFUNCTIONAL AND RECONFIGURABLE OPTICAL NODE AND OPTICAL NETWORK," published Jan. 17, 2008, as U.S. Patent Application Publication No. 2008/0013954, in its entirety as if fully set forth herein. The teachings of all patents, published applications, and references cited herein are incorporated by reference in their entireties.

In an optical mesh network, it is possible to route optical signals at different wavelengths around network failures using the reconfigurable capability of reconfigurable optical add/drop multiplexers (ROADMs) used within these networks. (The terms, "ROADM," "ROADM module," "ROADM core," and "ROADM core device," are used interchangeably herein.) In an event of a network failure and wavelength re-routing, a wavelength may be redirected from a first network node interface within the optical node to a second (different) node interface within the same optical node. If failure and re-routing occur, it would be useful if the optical node could route the redirected wavelength to the transponder attached to the first network node interface.

Example embodiments of the present invention provide methods and apparatus that allow a given transponder within an optical node to transmit signals to and receive signals from any of the network node interfaces within the same optical node. In one embodiment, an optical node and corresponding method of routing optical signals within an optical node may include at least two ROADMs to transmit respective wavelength division multiplexed (WDM) signals onto at least two internode network paths. Example embodiments may further include at least one add/drop routing module including add ports to direct each added signal received from tributary network paths to any of the ROADMs via intranode network paths to be available to be added to the internode network paths. Signals of the same wavelength may be added and dropped from the same add/drop routing module.

The add/drop routing module(s) may include a set of tunable filters used to select wavelengths to be dropped and a passive optical coupler network used to combine wavelengths to be added. Because the tunable filters and passive optical couplers are located on the add/drop routing module(s), and not on the ROADM(s) themselves, the tunable filters and passive optical couplers are said to be centralized with respect to the ROADM module(s) within the optical node.

Each ROADM includes a wavelength-selective switch (WSS). Channels to be added may be directed to the WSSs from add/drop ports via intranode network paths. Similarly, channels received at ROADMs via internode network paths may be optically coupled to respective WSSs on the at least one other ROADM.

The optical node may also include a bank of add/drop ports optically coupled to the routing module and configured to add channels to the WDM signals or drop channels from the WDM signals. The drop ports may be coupled to the routing module via respective tunable filters, whereas the add ports may be optically coupled to the routing module with or without respective tunable filters. In some embodiments, the bank of add/drop ports is integrated with the routing module; in others, the bank of add/drop ports includes ports selectively coupled to the routing module via optical switches. Alternatively, the bank of add/drop ports may be integrated with the ROADMs.

The routing module may include a multicast switch configured to route any WDM signal to at least one drop port and an aggregator switch configured to route any add channel to at least one ROADM. The routing module may also include a tunable filter configured to filter the WDM signal prior to the drop port and/or an optical amplifier configured to amplify the WDM signal prior to the tunable filter. Another amplifier in the routing module may amplify an output of the aggregator switch.

The node may further include a distribution module that optically connects the ROADMs to multiple routing modules, possibly via expansion ports in one or more of the routing modules.

Optical Networks

FIG. 1 illustrates an optical network 100 employing optical nodes 105a and 105b configured to transmit respective wavelength division multiplexed (WDM) signals 150 via internode network paths 110a-b according to an example embodiment of the present invention. The optical nodes 105a-b connect to the internode network paths 110a-b via network node interfaces; for example, optical node 105a connects to internode network paths 110a and 110b via network node interfaces 140a and 140b, respectively. The optical nodes 105a-b may include at least one add/drop routing module 115 in communication with at least two ROADMs 120a-b via intranode network paths 125. The add/drop routing module 115 may include an add port 130 and a drop port 135. The ROADMs 120a-b and add/drop routing module 115 may be configured by tuning the lasers in the transponders (not shown), attaching network node interfaces 140a-b to the internode network paths 110a-b, attaching add/drop routing modules to the ROADMs using fiber optic cables, or by any other suitable configuration method.

In operation, signals received on tributary network paths 140 may be added to WDM signals transmitted via the internode network paths 110a-b. The add port 130 may combine, amplify, and distribute signals 151 to the ROADMs 120a-b. The ROADMs 120a-b may combine and transmit the signals onto internode network paths 110a-b where the signals may flow to other network nodes 105b. The drop port 135 may be configured to drop signals 152 from internode network paths 110a-b to tributary network paths 140. That is, WDM signals received from internode network paths 110a-b may be received by the ROADMs 120a-b, from which they may flow to the at least one add/drop routing module 115. The drop port 135 may combine, amplify, and demultiplex WDM signals onto tributary network paths 140.

Thus, in the example embodiment of FIG. 1, optical nodes 105a-b may each include at least two ROADMs 120a-b configured to transmit respective WDM signals onto at least two internode network paths 110a-b. The optical nodes 105a-b may also each include at least one add/drop routing module 115, which includes add ports 130 configured to direct add wavelengths received from tributary network paths 140 to each of the at least two ROADMs 120a-b via intranode network paths 125 to be available to be added to the internode network paths 110a-b.

The add/drop routing module 115 may further include drop ports 135 coupled to each of the ROADMs 120a-b via the intranode network paths 125 configured to drop wavelengths from each of the internode network paths 110a-b to the tributary network paths 140. The add/drop routing module 115 may also include an expansion port that provides the ability to add additional add/drop ports to the add/drop routing module 115. In an example embodiment of the invention, the number of add/drop routing modules 115 is fewer than the number of ROADMs 120a-b.

The add/drop module 115 may be a "colored" add/drop routing module or a "colorless" add/drop routing module 115 and may further include a tunable filter array. A colored add/drop routing module contains colored add/drop ports, while a colorless add/drop routing module contains colorless add/drop ports. A colored add/drop port can only add/drop signals at specific wavelengths, while a colorless add/drop port can add/drop signals at any wavelength within the range of wavelengths supported by the optical node. The add/drop routing module 115 may also include an optical amplifier to amplify wavelengths transmitted to each of the ROADMs 120a-b via the intranode network paths 125.

The ROADMs 120a-b and the add/drop routing module 115 may further include express ports, where the number of express ports is a function of the number of ROADMs 120a-b and add/drop routing module(s) 115. Depending on the embodiment, the number of express ports on each ROADM may be greater than, equal to, or less than the number of express ports on each add/drop routing module.

The optical node 105a may also include a controller (not shown) operable to configure each ROADM 120a-b to select one of at least two signals of the same wavelength from the at least one add/drop routing module 115 and from at least one other ROADM, and place the selected signal on the respective internode path 110a-b. Alternatively, in embodiments including at least three ROADMs, the controller may be operable to configure each ROADM to select one of the at least two signals of the same wavelength from the other ROADMs and to output the selected signal on the respective internode path 110a-b. In embodiments including multiple add/drop routing modules, such as the embodiment shown in FIG. 2, the controller may be operable to allow each ROADM 120a-b to select one of the at least two identical wavelengths from among the multiple add/drop routing modules.

The add/drop routing module 115 may include multiple optical devices, such as optical couplers, optical switches (routers), amplifiers, and multiplexers/demultiplexers. In an alternative example embodiment, the optical node 105a may be a core node of a metro network configured to deliver video content from content servers via nodes of the metro network to nodes on tributary network paths coupled to the metro network by the core nodes. The optical node 105a can also be used to distribute other types of rich content, such as high-definition television (HDTV) signals. Various embodiments of the optical node 105a may provide low latency when delivering video signals by eliminating the optical-electrical-optical conversions present in other types of switching. In addition, various embodiments of the invention may enable random A-to-Z traffic patterns, relaxing requirements for accurate traffic forecasting while avoiding wavelength blocking and contention problems.

Each ROADM core (e.g., ROADMs 120a and 120b) in the optical network 100 performs at least two fundamental operations: (1) broadcasting each wavelength received via the input of its network node interface 140a-b to all other ROADM cores 120a-b and add/drop modules 115 (via its optical coupler); and (2) selecting wavelengths from all other ROADM 120a-b and add/drop routing modules 115 for transmission via the output of its network node interface 140a-b (via its wavelength selective switch (WSS)).

Setting aside the add/drop modules 115 for the moment, there can be up to m signals present on the input of each network node interface 140a-b. Similarly, there can be up to m signals present on the output of each network node interface 140a-b. Because each ROADM 120a-b sends all of its m signals present on its input network node interface to each of the other ROADMs 120a-b, each ROADM 120a-b can select signals for transmission on its output network node interface from among all the wavelengths arriving on all of the input network node interfaces of the optical node other than its own input network node interface. Further, since each ROADM 151-154 includes a variable optical attenuator (VOA) for each output wavelength, the signals exiting each output network node interface can be power equalized, regardless of their input network node interfaces.

Optical Nodes

FIG. 2 shows an optical node 199 that includes four ROADMs 151-154 and two add/drop routing modules 161-162 according to an embodiment of the present invention. Each ROADM 151-154 provides one network node interface (or one node degree) and includes a respective WSS 191-194. Each ROADM 151-154 may be configured to add and/or drop channels via intranode network paths that are optically coupled to the respective WSSs 191-194 on any of the other ROADMs 151-154. Each ROADMs 151-154 may also be configured to receive channels via internode network paths that are optically coupled to the respective WSSs 191-194 on any of the other ROADMs 151-154.

Each add/drop routing module 161-162 provides N add/drop interfaces that can be used to direct signals to any of the four ROADM network node interfaces #1-4. Furthermore, signals of the same wavelength may be added and dropped from the same add/drop routing module 161-162.

The ROADM cores 151-154 may also include one or more optical couplers, multiplexers, demultiplexers, optical amplifiers, and control units. Example ROADMs, couplers, multiplexers, etc., are well known in the art and are described in U.S. application Ser. No. 12/380,811 and U.S. application Ser. No. 12/319,839, each of which is incorporated herein by reference in its entirety.

The optical node 199 also includes controllers 170-171 that may be connected to each of the ROADMs 151-154 and the add/drop routing modules 161-162. The controllers 170-171 can be used to control the ROADMs 151-154 to select one of at least two signals at the same wavelength transmitted from one of the other modules 161-162 or ROADMs 151-154 in the optical node. For example, the controller 171 can cause ROADM 151 to select one of the signals emitted at the same wavelength from the other ROADMs 152-154, the add/drop routing modules 161-162, or a combination of the other ROADMs 152-154 and add/drop routing modules 161-162.

Each add/drop router module 161-162 includes N add/drop ports, so the node 199 is a four-degree node with two banks of N channel add/drop ports, each of which is connected to a corresponding transponder (not shown). Signals from any of the 2N transponders connected to the add ports can be directed to any of the four output network node interfaces (labeled #1, #2, #3, and #4). Similarly, any signal received from any of the input network node interfaces can be directed to any of the transponders connected to the banks of drop ports. Since a given signal from a given transponder can be forwarded from its corresponding add port to any of the network node interfaces, the add port is a directionless add port (i.e., the add port is not permanently attached to a specific node interface). Likewise, since a signal arriving at any network node interface can be forwarded to any of the drop ports, these drop ports are directionless drop ports.

The WSSs 151-154 provide each ROADM 151-154 with the ability to select signals at different wavelengths from any of the input network node interfaces for placement on one of its network node interfaces (other than the input network node interface). However, each individual wavelength can only be present at most one time on any given output network node interface. For example, the ROADM 152 associated with network node interface #2 can receive signals at wavelength $\lambda_2$ from any of input network node interfaces #1, #3, and #4, but it can only select one of these signals to be placed on its output network node interface at a time.

The add/drop router modules 161-162 (or simply add/drop modules) add another capability to the optical node 199. Specifically, the add/drop router modules 161-162 allow signals received from any of the input network node interfaces to be dropped to transponders (not shown) connected to the drop ports of the add/drop router modules 161-162. The add/drop router modules 161-162 also allow signals to be forwarded to any output network node interface from transponders (not shown) connected to the add ports of the add/drop router modules 161-162.

In particular, in the add direction, up to N transponders (each tuned to one of up to m wavelengths for a system with m unique wavelengths) can be connected to the N add ports of a given add/drop router module 161-162. In general, N<m. Optical circuitry within each add/drop router module 161-

162 is then used to multiplex up to N signals at each of N wavelengths into multiple composite optical signals exiting the add/drop router module towards the ROADMs within the system. These composite signals may be amplified by optical amplifiers within the add/drop module 161-162 before being sent to all of the ROADM cores 151-154. The WSS in each ROADM core 151-154 can then select a signal for output transmission from among the signals from each add/drop module and the other ROADM cores 151-154.

In the drop direction, each add/drop routing module 161-162 receives up to m wavelengths from each of the ROADM cores 151-154. The add/drop routing module 161-162 then selects up to N signals at up to N different wavelengths from among the signals received from the ROADM cores 151-154, and transmits the selected signal on its N output ports. For example, consider a particular signal that is directed from a network node interface #j to a particular transponder connected to a drop port on a given add/drop module. If a network failure causes this signal to arrive on input network node interface #p, then the add/drop module 161-162 can switch the signal to the same transponder that originally received the signal from network node interface #j.

Some or all of the add/drop ports on the add/drop routing module 161-162 may be contentionless. That is, signals of the same wavelength (but different data content), may be added or dropped from the same add/drop routing module. For example, if signal 1 at wavelength $\lambda_1$ arrives on network node interface #1 and signal 2 at wavelength $\lambda_1$ arrives on network interface #2, both signals can be dropped from the same add/drop module even though the two signals are at the same wavelength. Similarly, if signal 1 of wavelength $\lambda_1$ is sent to an add port on a given add/drop routing module and signal 2 of wavelength $\lambda_1$ is sent to a different add port on the same add/drop routing module, then signal 1 can be routed to any of the network node interfaces and signal 2 can be routed to any of the network node interfaces except to the one to which wavelength 1 was sent. Thus, the two signals do not contend with one another.

Each of the ROADMs 151-154 may include a 5×1 WSS. Additionally, a 4×1 WSS can be used within the ROADMs 151-154 if the input signals from the add/drop routing modules are combined (e.g., via an optical coupler on the ROADM module) and sent to a single input on the WSS in each ROADM module 151-154. This can be done because signals of the same wavelength are not typically sent to a given ROADM module 151-154 from both of the add/drop routing modules 161-162. The coupler used to combine the input signals may have any number of inputs without increasing the size of the WSS on the ROADM module.

The same type of ports (e.g., express ports or intra-network ports) on the ROADM modules 151-154 are connected to both the other ROADM modules 151-154 and the add/drop routing modules 161-162. This provides for flexibility, since more ROADM modules can be added by decreasing the number of add/drop routing modules 161-162, or more add/drop routing modules can be added by decreasing the number of ROADM modules 151-154. Furthermore, adding either an additional add/drop routing module 161-162 or an additional ROADM module to unused express ports on the existing ROADMs 151-154 within the node 199 may be done such that there are no interruptions in the data flow of the existing paths within the node 199. (This is referred to as adding a module "hitlessly.")

Although FIG. 2 does not show input and output amplifiers connected to any of the network node interfaces, an input line amplifier and/or an output line amplifier may be present between each network node interface and the corresponding ROADM 151-154.

Add/Drop Routing Modules

Figure 3A:
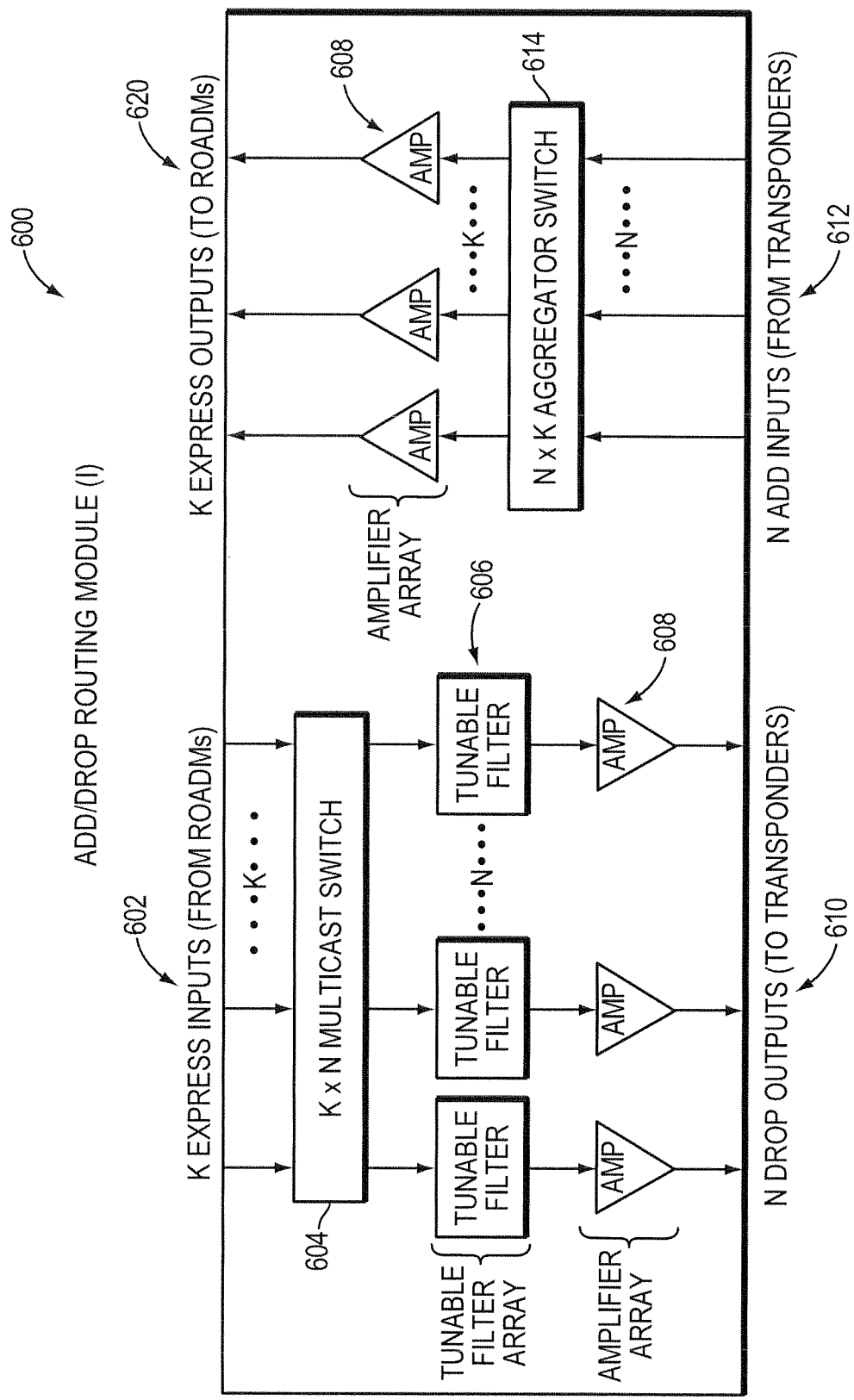
FIGS. 3A and 3B are block diagrams of add/drop routing modules according to example embodiments of the present invention.

FIG. 3A shows an add/drop routing module 600 according to principles of the present invention. There is both a "drop" portion of the module and an "add" portion of the module. The drop portion includes a K×N multicast switch 604, a tunable filter array 606, and an amplifier array 608, whereas the add portion includes an N×K aggregator switch 614 and an amplifier array 608. The add portion includes N add inputs 612 optically coupled to an N×K aggregator switch 604, which is coupled to K express outputs via an amplifier array 608.

The K×N multicast switch 604 can be constructed using discrete optical components, but preferably, a portion, or the entire structure, can be fabricated on a planar lightwave circuit (PLC) to shrink the size of the structure while at the same time lowering the cost of the structure. The switch 604 directs the wavelengths arriving on a particular express input 602 to a particular tunable filter within the array of tunable filters 606. The multicast switch 604 is programmable and is able to route signals in a completely non-blocking manner. This means that the signals arriving on any of its inputs can be routed to any of the tunable filters without any restrictions. Furthermore, the signals arriving at any of the inputs can be routed to any or all of the filters in the tunable filter array 606. If signals at up to m different wavelengths are directed to a given input of the multicast switch 604, the switch 604 can direct all of the signals to a given input of a given tunable filter. The tunable filter selects one of the signals, then forwards the selected signal to its drop port.

Typically, the optical power levels of the signals received at the express inputs 602 are low due to insertion loss and other sources, so an amplifier array 608 placed after the tunable filter array 606 may amplify the selected signals sufficiently to be detected by the receivers in the transponders (not shown) connected to drop outputs 610. The amplifier array 608 may be an array of Silicon Optical Amplifiers (SOAs) or an array of Erbium-Doped Fiber Amplifiers (EDFAs). Although the amplifier array 608 may be placed at the input of the multicast switch 604, it may also be placed at the output of the tunable filter array 606. By placing the amplifier array 608 after the tunable filter array 606, the amplifier may only require enough optical power to amplify signals at a single wavelength (rather than signals at all m wavelengths).

As an example, assume that target input power level for each transponder is −14 dBm and the power level of each signal arriving at the express input ports 602 is −8 dBm. Also assume that the insertion loss of the multicast switch 604 is 14 dB and the insertion loss of each tunable filter is 4 dB. In this case, to provide a minimum power level of −14 dBm at the input to each transponder, the signals arriving at the express inputs 602 should be amplified by 12 dB (−8 dBm−14 dB−4 dB+12 dB=−14 dBm). Although this gain is relatively small, if each amplifier is placed at the input to the multicast switch, the power of each signal exiting each amplifier may be about +4 dBm (because −8 dBm amplified by 12 dB is +4 dBm).

If eighty-eight channels are present on each express input (i.e., m=88), then the total optical power required out of each amplifier placed at the input to the multicast switch may be equal to about 220 mW. Assuming that there are six express inputs 602 (K=6) and an amplifier array 608 with six amplifiers, each supplying 220 mW, the total optical power is about 1.3 W. Generating this amount of optical power may require six to twelve optical pump lasers, which may not be practical.

Alternatively, placing the amplifier array 608 at the output of the tunable filter array 606 reduces the power requirements (but not the gain requirements). Each amplifier in the array 608 should still provide 12 dB of gain, but the amplified signal may only have to be −14 dBm, the threshold for the transponder (not shown). If there are eight tunable filters (N=8), then the total output power for all eight amplifiers equals 0.32 mW, a fraction of the 1.3 W of the previous case.

One drawback to placing the amplifier array 608 after the tunable filter array 606 is the poor noise figure of each amplifier. The noise figure affects the signal's Optical Signal to Noise Ratio (OSNR) according to the formula:

$$\text{OSNR} = 58 - G + P_{OUT} - NF$$

where G is the gain of the amplifier, $P_{OUT}$ is the per wavelength output power of the amplifier, and NF is the noise figure of the amplifier for the gain setting G. Assuming NF=6 dB, the OSNR of each signal amplified by an amplifier array 608 before the switch 604 is 44 dB. In contrast, the OSNR falls to 26 dB when the amplifier array 608 is after the filter array 606. Thus, the placement of the amplifier array 608 depends on both the desired OSNR and the optical power requirements.

Losses in paths through the multicast switch 604 may be adjusted by redistributing the optical power among amplifiers in the amplifier array 608 driving the inputs to the multicast switch, as described in U.S. Patent Application Publication 2009/0067845 A1. For such an amplifier array 608, a worst case occurs when a single amplifier drives all N outputs of the multicast switch 604. Given the power levels, etc., above, the total output power required by a single amplifier driving all N outputs is 221 mW, while none of the other amplifiers in the array 608 need any power. This is still much larger than the 0.32 mW required when the amplifier array 608 is placed after the tunable filter array 606, as shown in FIG. 3A.

Figure 3B:
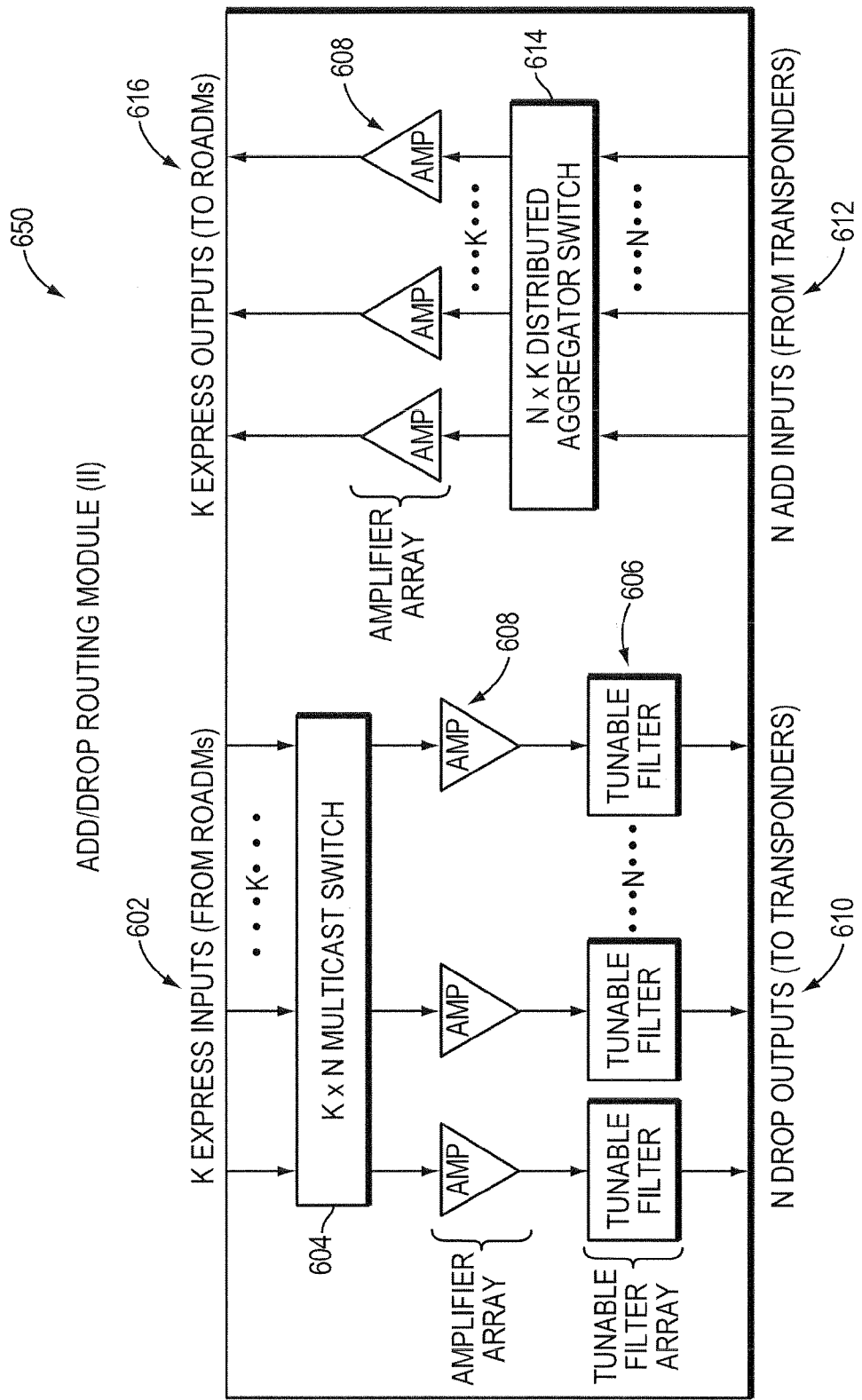

FIG. 3B depicts an alternative add/drop routing module 650 according to an embodiment of the present invention. The FIG. 3B add/drop routing module is identical to the add/drop routing module 600 of FIG. 3A except that the amplifier array 608 is placed between the output of the multicast switch 604 and the input to the tunable filter array 606. Assuming a tunable filter insertion loss of 4 dB as above, the FIG. 3B add/drop routing module's OSNR may be 4 dB higher than that of the FIG. 3A module. Thus, the alternative routing module 650 trades higher amplifier output power for higher OSNR and represents a nice compromise of complexity, OSNR, and amplifier output power. For the same example parameters defined above, the OSNR of each amplified signal is 30 dB (58−12−10−6=30) and the per-signal output power is −10 dBm. The optical power at the input of the transponder is −14 dBm, since the insertion loss of the tunable filter causes the power out of the amplifier to drop by 4 dB. Assuming that there are eight tunable filters (N=8), the per-amplifier output power is 8.8 mW (for 88 wavelengths) and the total amplifier array output power is 70.4 mW, or approximately one-third the output power of the implementation described in US 2009/0067845 A.

A final alternative to amplifying the signals through the add/drop routing module 600/650 is to utilize two amplifier arrays: a first array prior to the inputs of the multicast switch, and a second array after the outputs of the multicast switch (just prior to the inputs of the tunable filters). For example, if both amplifier arrays have a gain equal to 6 dB and noise figures of 6 dB, then the per wavelength power of the wavelengths exiting the first array and second arrays is equal −2 dBm and −10 dBm, respectively. This results in an OSNR of 44 dB for the first array and an OSNR of 36 dB for the second array. The OSNR associated with the combination of both amplifier arrays is 35.3 dB. The combined optical power for all the amplifiers in both arrays is 403 mW. Therefore, using two amplifier arrays provides a way of generating a higher OSNR at the expense of having to generate a higher amount of optical power.

Multicast and Aggregator Switches

Suitable multicast and aggregator optical switches include those from Enablence Technologies Inc. and Lynx Photonic Networks LTD. In particular, U.S. Pat. No. 6,236,775 B1 discloses a K×N switch constructed with (K−1)N two-by-one switches, (N−1)K one-to-two couplers, and $$(K-1) \times \sum_{i=1}^{N-1} i$$

optical crossovers, or points where two optical paths "cross over" each other. Reducing the number of optical crossovers improves the ease of fabrication by reducing the size and increasing the efficiency of the die used to make switches with PLC techniques.

Figure 4:
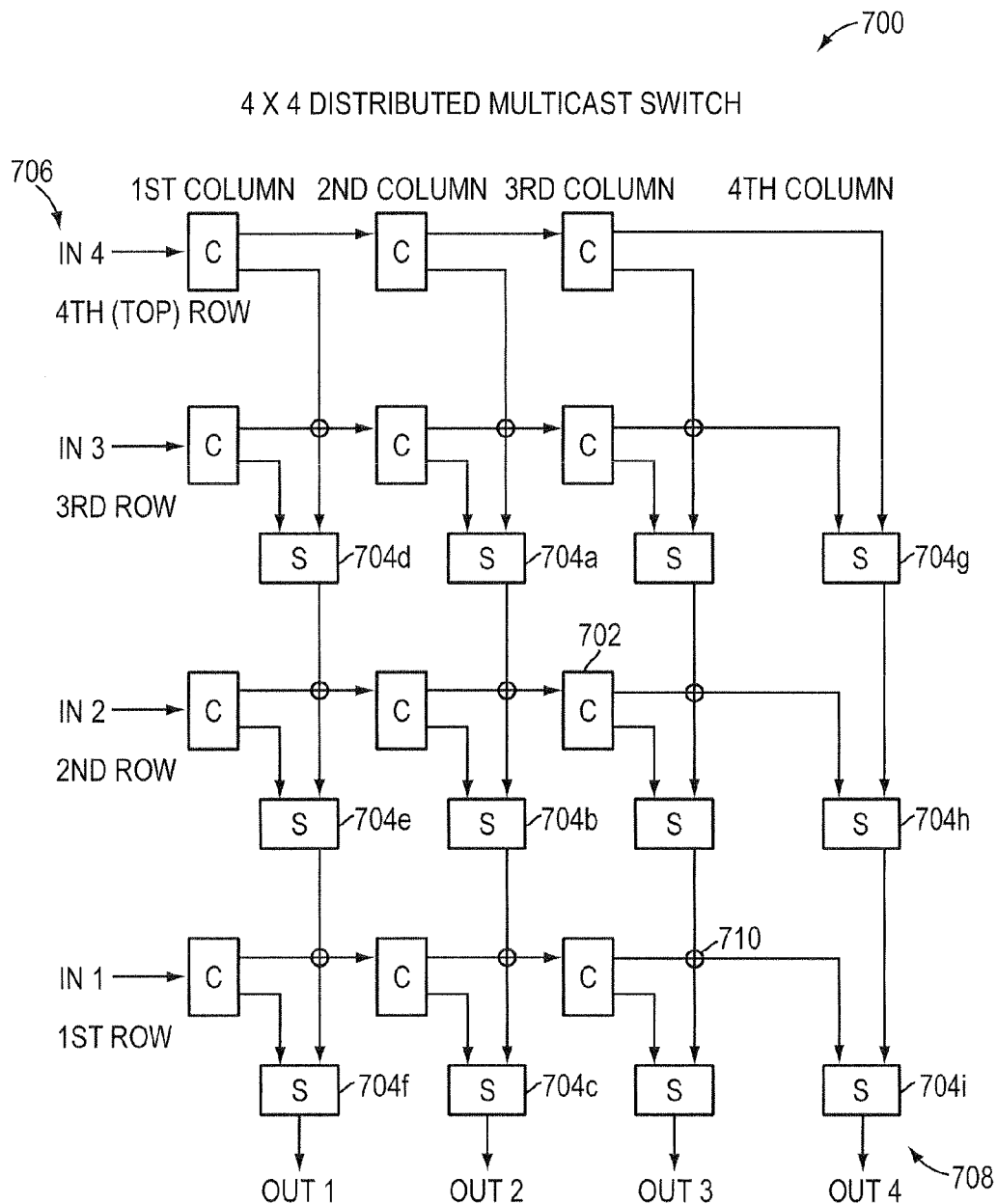
FIG. 4 is a block diagram of a distributed multicast switch according to an example embodiment of the present invention.

FIG. 4 shows a K×N multicast switch 700 constructed according to an example embodiment of the present invention using (K−1)N two-by-one switches 704a-704i (generally, switches 704), and (N−1)K one-to-two couplers 702, with (K−1)(N−1) optical crossovers 710.

There are nine optical crossovers 710 in the distributed multicast switch 700. As pointed out in U.S. Pat. No. 7,215,854 B2, each optical crossover 710 within a PLC may contribute to optical loss and can be a source of crosstalk into other channels. Limiting the number of crossovers 710 can decrease the complexity of the PLC while simultaneously increasing the performance of the PLC. Although both the switch 700 and the switch in U.S. Pat. No. 6,236,775 B1 include the same number of couplers and switch elements, the switch 700 includes far fewer optical crossovers 710, and, therefore, is easier to make.

In the switch 700, the couplers 702 and switches 704 are equally distributed across a K by N array. In general, each intersection of the K by N array includes one 1:2 coupler 702 and one 2:1 switch 704. Since the switches 704 and couplers 702 are equally distributed across the switch array, the structure is referred to as a K by N Distributed Multicast Switch 700. The repeatable structure lends itself to a very efficient layout. Although the distributed multicast switch 700 has four inputs 706 and four outputs 708, switches according to the present invention may include any number of inputs and outputs. In addition, K×N switch arrays are not limited to cases where K=N.

The multicast switch 700 operates as follows. Each optical input 706 to the device (In 1 to In 4) receives optical signals at one or more wavelengths. The signals are power divided by a first coupler 702. The output of the first coupler 702 is then forwarded to both a second coupler 702 and a first switch 704. Although the second coupler 702 and the first switch 704 receive the same signals, the power levels of the signals received by second coupler 702 and the first switch 704 may be different, depending upon the optical coupling ratio of the first coupler 702. For example, the first coupler 702 may direct 20% of the optical power of the signals to the first switch 704 and 80% of the optical power to the second coupler 702 (neglecting loss).

In the switch 700, input signals applied to a given row of the switch array are allowed to propagate to all columns of the switch array 700 via a series of cascaded 1 to 2 optical couplers 702. At each column, a given coupler 702 in a given row forwards a copy of the input signals to the input of a corresponding switch 704. The switch 704 at the intersection of each row and column of the array is then used to either forward the signals from the coupler 702 towards the outputs 708 or to "block" the signals from being forwarded to the outputs 708.

Each optical switch 704 is actively controlled, and the setting of all optical switches 704 determines which of the input signals to the switch array 700 are forwarded to each of the outputs 708 of the switch array 700. Since the cascaded couplers 702 in each of the rows of the switch array 700 broadcast each of the input signals to all columns of the switch array 700, each input signal may be forwarded to any or all of the output ports 708 by properly programming the switches 704 within the array 700.

For example, to forward a signal arriving on the "In 4" input port 706 to the "Out 2" output port 708, the series of cascaded couplers 702 associated with the top row of the switch fabric is used to broadcast the input signal to all the columns in the switch array 700, including the second column. Thus, the signal propagates to the input of the first switch 704a in the second column of the switch array 700. To forward the signal down the second column of the switch array 700 towards the "Out 2" port 708, the switch 704a is programmed to pass the signal from the "In 4" port 706 while blocking the signal from the "In 3" port 706. This action allows the signal to propagate down to the switch 704b in the second row, second column, of the switch array 700. The switch 704b is then programmed to pass the signal from the switch 704a to the input of the switch 704c in the first row, second column, of the array 700 while blocking the signal from the "In 2" port 706 from propagating to the input of the switch 704c. Finally, the switch 704c is programmed to pass the signal from switch 704c to the "Out 2" port 708.

As a second example, to forward the signal arriving on the "In 3" input port 706 to both the "Out 1" output port 708 and the "Out 4" output port 708, the series of cascaded couplers 702 associated with the third row of the switch fabric 700 is used to broadcast the input signal to all the columns in the switch array 700. Thus, the signal propagates to the input of the switches 704 in the third row within the first and fourth columns of the switch array 700.

To forward the signal down the first and fourth columns of the switch array 700 towards the "Out 1" and "Out 4" ports, the switches 704d and 704g in the third row of the first and fourth columns of the array 700 are programmed to pass the signal from the "In 3" port 706 while blocking the signal from the "In 4" port 706. This allows the signal to propagate down to the switches 704e and 704h in the second row of the first and fourth columns of the switch array 700. The switches 704e and 704h are then programmed to pass the signal from switches 704d and 704g to the inputs of switches 704f and 704i in the first row of the first and fourth columns of the array 700 while blocking the signal from the "In 2" port 706 from propagating to the input of switches 704f and 704i. Finally, switches 704f and 704i are programmed to pass the signals from switches 704e and 704h to "Out 1" and "Out 2" ports 708.

Figure 5:
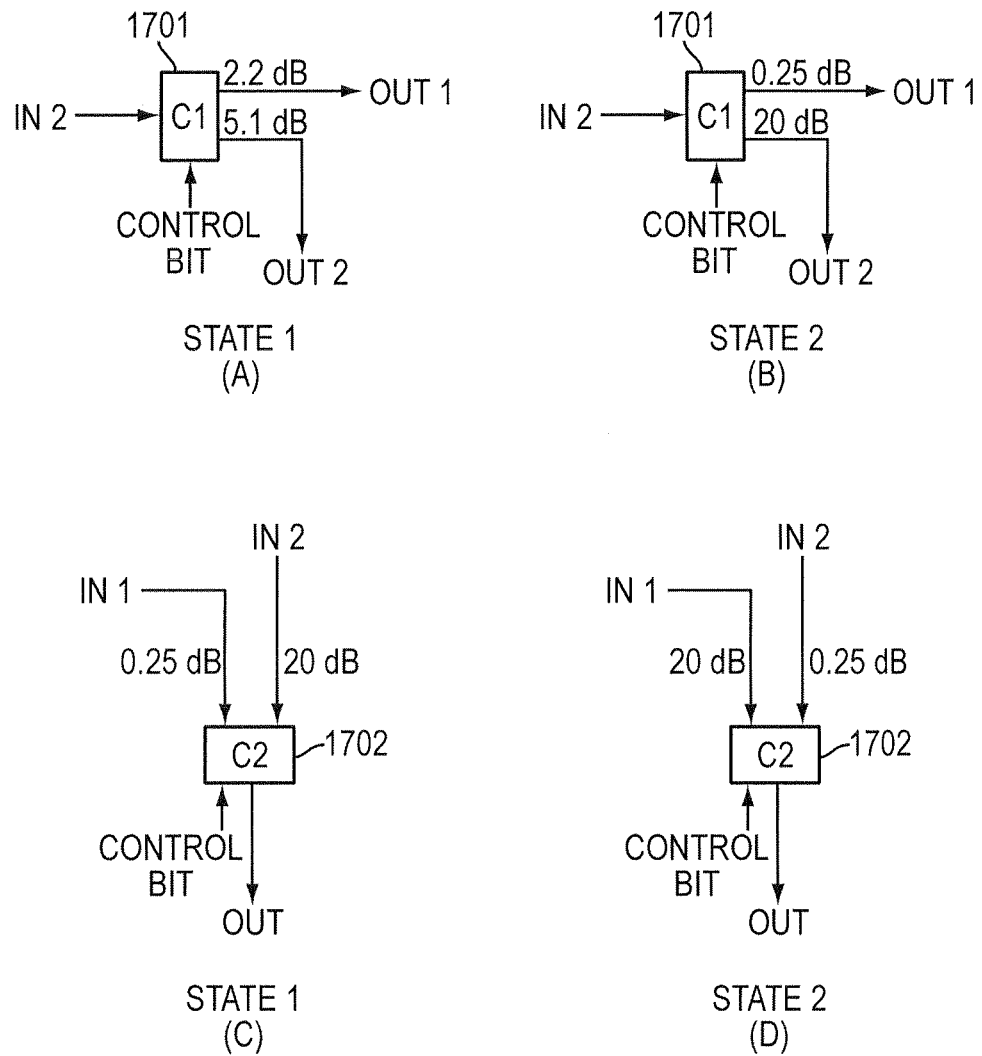
FIG. 5 is a block diagram showing two types of switchable optical couplers according to an example embodiment of the present invention.

FIG. 5 illustrates first and second two-state optical couplers (also referred to as switchable optical couplers) 1701 (C1) and 1702 (C2), respectively, that may be used in any of the nodes, ROADMs, distributor switches, and aggregator switches disclosed herein. A single binary control signal is used to set the state of each coupler. The first coupler 1701 switches between a predefined, static coupling ratio and a 99/1 coupling ratio, whereas the second coupler 1702 switches between a 99/1 coupler where the 99% path is on one input leg of the coupler to a 1/99 coupler where the 99% path is on the other input leg of the coupler (essentially creating a low-isolation 2-to-1 optical switch).

In many technologies, the highest level of optical isolation is approximately 20 dB for a single optical structure in a PLC-based component as discussed, for instance, in Timo Aalto et al., "Fast Thermal-Optical Switch Based on SOI Waveguides," Proc. SPIE, Vol. 4987, 149 (2003), incorporated herein by reference in its entirety. The first coupler 1701 achieves this isolation when switched as shown in (b), whereas the second coupler 1702 maintains this maximal isolation as shown in (c) and (d). As further discussed in the Aalto paper, placing PLC-based switches, including switches 1701 and 1702, in series makes it possible to achieve up to 40 dB of isolation.

FIG. 6 shows how a 4×4 unidirectional, distributed optical multicast switch 1800 constructed using high-isolation, two-state optical couplers 1801a-c (generally, 1801) and 1802a-e (generally, 1802), such as those shown in FIG. 5, to achieve up to 40 dB of isolation between adjacent rows of the switch array 1800. One input of the coupler 1802a in the upper right corner (i.e., in the fourth column, fourth row) is not connected (NC). Properly programming each coupler 1801, 1802 in the array 1800 ensures that a given input signal is properly switched from an input port 1806 to one or more output ports 1808. As explained with reference to FIG. 5, each coupler 1801 directs an input signal to one or both of its outputs depending on the control bit. In contrast, each coupler 1802 directs an input signal to one or the other of its outputs depending on the control bit.

Setting the control bits of each coupler 1801, 1802 in the array 1800 makes it possible to switch signals from any input port 1806 to any output port 1808. As shown in FIG. 6, a signal arriving at the input 1806 in the second row may be directed to outputs in the second and third columns as follows. First, coupler 1801a is set to state 2, allowing the signal applied to input 2 of the array to propagate to the input of coupler 1801b. Also, the couplers 1801b and 1801c are set to state 1, thus allowing the signal applied to the input of the second row to propagate to the left inputs of couplers 1802b and 1802d. Next, both couplers 1802b and 1802d are programmed to state 1, allowing the signal applied to input In 2 of the switch array 1800 to propagate to the right inputs of couplers 1802c and 1802e. Finally, couplers 1802c and 1802e are set to state 2, allowing the signal to propagate to outputs Out 2 and Out 3 of the switch array 1800.

Couplers 1802c and 1802e isolate signals applied to their left inputs by 20 dB. Adjacent switches may be set appropriately to provide up to an additional 20 dB of isolation. For example, to further isolate the signals at Out 2 and Out 3 from signals present at the inputs of couplers 1801d and 1801e, couplers 1801d and 1801e are both set to state 2. Similarly, to isolate the signal exiting 1802d by up to an additional 20 dB, coupler 1802f is set to state 1 and coupler 1801f is set to state 2. Likewise, couplers 1802g and 1801g may be set to states 1 and 2, respectively, to isolate signals exiting switch 1802b.

Using the two-state optical couplers 1801, 1802 to implement distributive optical multicast switches allows the use of low insertion loss switches (0.25 dB switches for instance, instead of double isolated 0.5 dB switches), while still achieving up to 40 dB of isolation between rows of the switch array. High isolation and the use of low-loss switches are useful when building large distributed switch arrays with large numbers of cascaded switches.

Figure 7A:
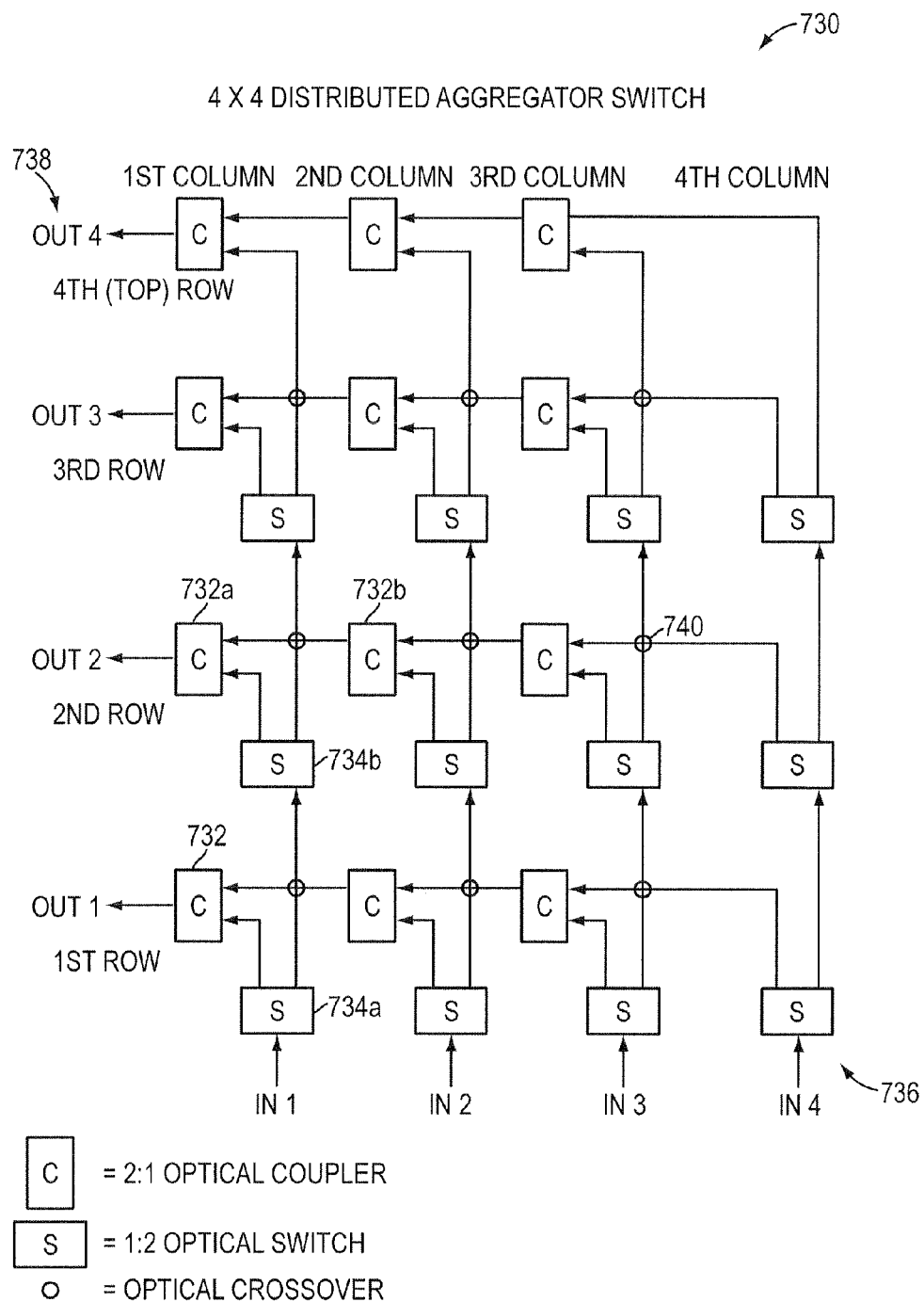
FIGS. 7A and 7B show block diagrams of distributed aggregator switches according to example embodiments of the present invention.

FIG. 7A illustrates an implementation of an N×K aggregator switch 730 with four inputs 736 and four outputs 738. The aggregator switch 730 is constructed using (N−1)K one-by-two switches 734a and 734b (generally, switches 734) and (K−1)N two-to-one optical couplers 732a-b (generally, couplers 732), with (K−1)(N−1) optical crossovers 740. The aggregator switch 730 "aggregates" one or more signals at different wavelengths into one or more composite signals that include (in some instances) multiple optical wavelengths. When a single wavelength is applied to each of the input ports 736 of the aggregator switch 730, the switch can combine one or more of the input signals into one or more of the optical signals exiting the output ports 738.

In one case, the switch 730 may be programmed to route signals at different wavelengths to different output ports 738. In a second case, the switch 700 may be programmed to route each signal to the same output port 738, assuming the signals are at different wavelengths. In yet another case, the switch 730 may be programmed to route signals at two different wavelengths to the same output port 708 while simultaneously routing signals at two other input wavelengths to different output ports 708. Programming the switches 734 within the aggregator switch 730 determines which signals will exit a particular output port 708.

For instance, to forward the signal applied to the "In 1" port 736 to only the "Out 2" port 738, the switch 734a in the first row of the first column of the switch 730 is programmed to pass the corresponding wavelength from the "In 1" port 736 to the input of the switch 734b in the first column, second row, of the switch array 730. The switch 734b is then programmed to pass signals at the corresponding wavelength from its input to the lower input of the coupler 732a in the first column, second row, of the switch array 730. The coupler 732a combines signals at its input with signals received from the coupler 732b in the second column, second row, of the array 730, then sends the resulting composite optical signal out the "Out 2" port 738.

In effect, the distributed aggregator switch 730 performs the inverse function of the distributed multicast switch 700 (FIG. 4). In fact, the aggregator switch 730 is identical to the distributed multicast switch 700 except for the direction of signal propagation. This means that one implementation can be used to make both types of switches.

Figure 7B:
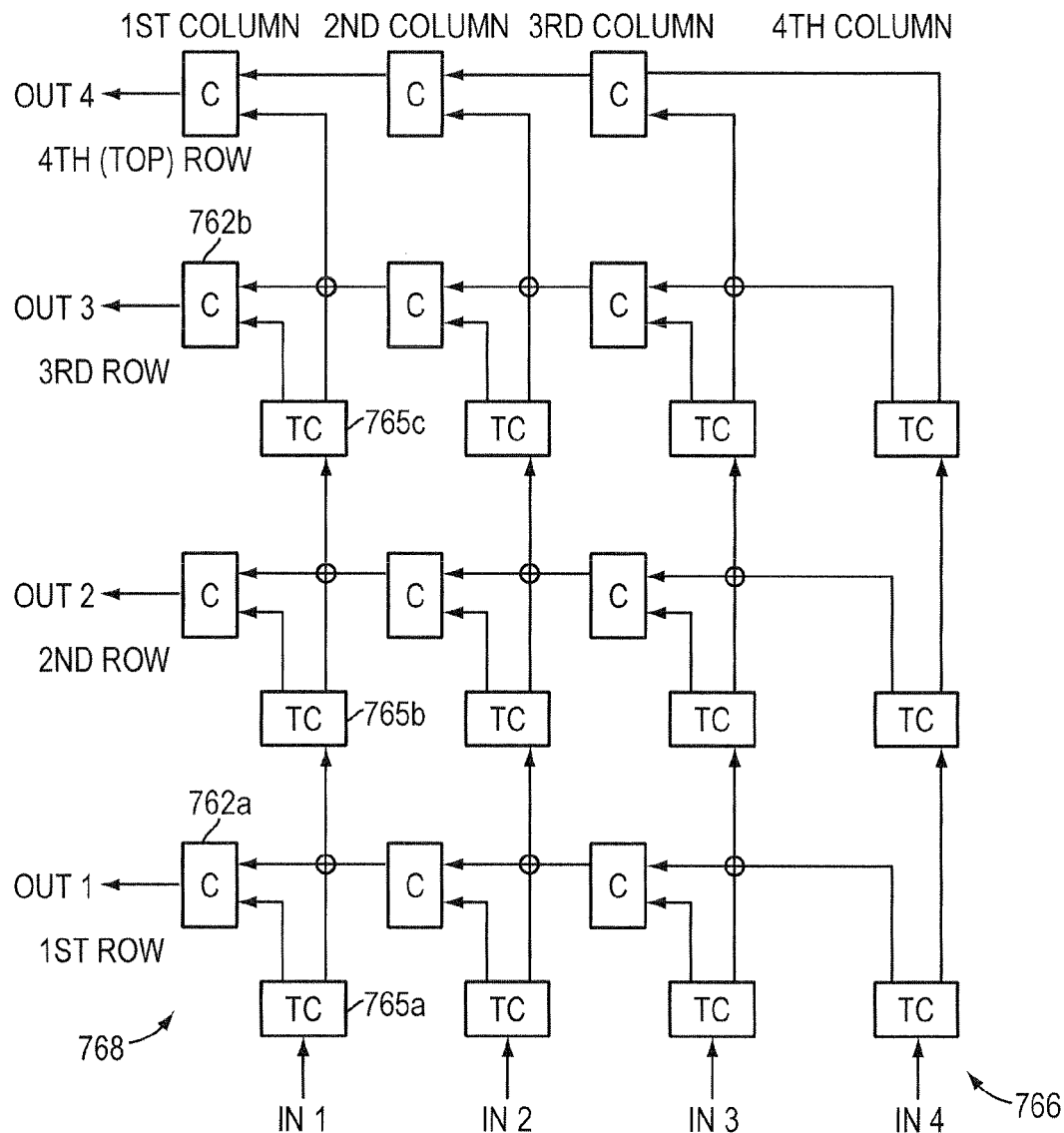

FIG. 7B shows a distributed aggregator switch 760 with multicast, or the ability to forward a signal to multiple output ports 768. This is accomplished by replacing the switches 734 in each row and column of the switch array 730 (FIG. 7A) with tunable optical couplers 765a-c (generally, tunable couplers 765). Each tunable optical coupler 765 can forward any programmable amount of input light received at its input port to either of its two output ports. When 100% of the input light is sent to one or the other output ports of the coupler 765, then the tunable coupler 765 behaves as a one-to-two switch, and the switch 760 reverts back to the aggregator switch 730 shown in FIG. 7A. However, if the tunable coupler 765 is programmed to send 50% of the light received at its input to each of its outputs, then the coupler 765 can forward a copy of the signal applied to its input to each of its two outputs.

For example, consider sending a signal applied to input port "In 1" 766 to output ports "Out 1 and "Out 3" 768, but no other output ports. To do this, the tunable coupler 765a in the first row, first column, of the switch array 760 is programmed to send a portion of its input light to a fixed coupler 762a in the first row, first column, and a portion of its input light to the tunable coupler 765b in the second row, first column, of the switch array 760. The tunable coupler 765b is then programmed to forward all of its input light to the tunable coupler 765c in the third row, first column. The tunable coupler 765c is then programmed to send all of its input light to the fixed coupler 762b in the third row, first column. This results in a copy of the signal applied to the "In 1" port 766 being sent to both the "Out 1" port 768 and the "Out 3" port 768, but not to any other output ports 768.

The tunable couplers 765a can also be programmed to compensate for the different insertion losses associated with different paths through the switch 760. In the above example, the tunable coupler 765a may be programmed to send slightly more light towards the "Out 3" port 768, thereby compensating higher insertion loss due to the additional components (e.g., tunable couplers 765b and 765c) in the path to the "Out 3" port 768. Additional optical path optimization can be achieved by converting the fixed couplers (e.g., couplers 762a and 762b) to tunable optical couplers 765. For instance, in the previous example, replacing the fixed coupler 762a with an "output" tunable coupler makes it possible to equalize the signal output power by compensating for differences in insertion loss among different paths through the switch 760.

Multicast and Aggregator Switches

Figure 8A:
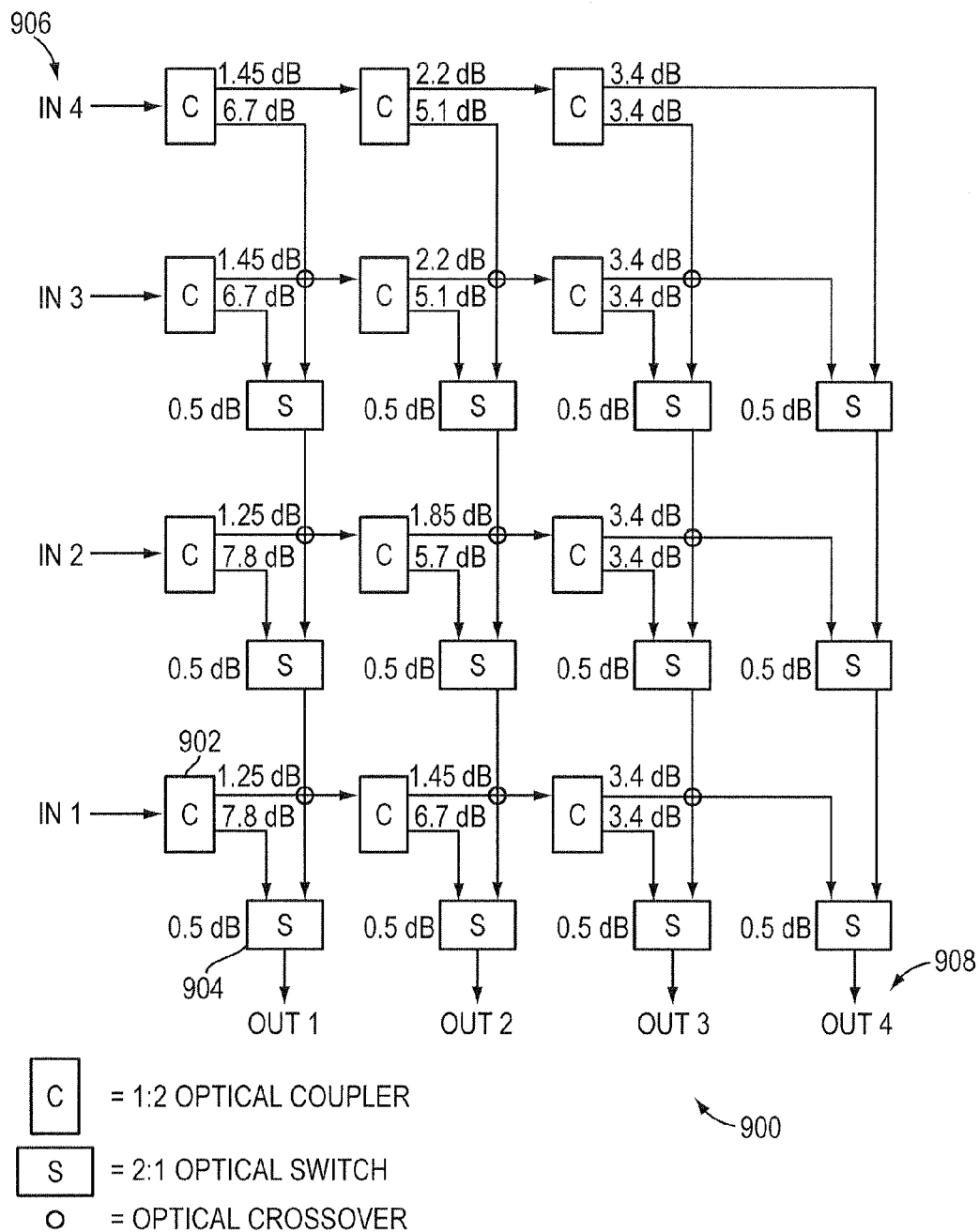
FIGS. 8A-8C shows block diagrams of alternative distributed multicast switches according to example embodiments of the present invention.

FIG. 8A shows a 4×4 unidirectional distributed optical multicast switch 900 including 2-to-1 optical switches 804 and fixed (i.e., non-tunable) optical couplers 802 with assigned coupling ratios. The switch 900 is referred to as a unidirectional switch because the signal flows from input 906 to output 908 in one continuous direction from the left side of the switch 900 to the bottom of the switch 900.

The coupling ratios of each coupler 802 are chosen so as equalize the insertion loss from each input 906 to each output 908. (The insertion loss of each 2 to 1 switch 804 in the switch array 900 may be 0.5 dB.) The coupling ratios assigned to the optical couplers 802 are standard 5% coupling ratios of off-the-shelf, premium-grade optical couplers 802, such as those manufactured by Oplink Communications Inc. Setting the coupling ratios such that the insertion loss of all input to output paths are as close to identical as possible, while also as low as possible, preserves and equalizes output signal power.

For example, an optical signal applied to port "In 1" and directed to port "Out 1" may experience an optical insertion loss of 7.8 dB, followed by an insertion loss of 0.5 dB at the switch 804, for a total insertion loss of 8.3 dB. Similarly, an optical signal applied to port "In 3" and directed to port "Out 2" may experience an optical insertion loss of 1.45 dB, followed by an insertion loss of 5.1 dB, followed by three successive insertion losses of 0.5 dB each, for a total insertion loss of 8.05 dB.

The paths from the lower inputs 906 of the switch array 900 traverse fewer optical elements compared to the paths from the upper inputs 906 of the array 900. For instance, a signal applied to port "In 1" may pass through a single 2-to-1 switch element 904 (regardless of which output put it is directed to), while a signal applied to port "In 4" may pass through three 2-to-1 switch elements 904 (regardless of which output put it is directed to). Therefore, the switch array 900 is inherently biased to the lower array inputs 906. This bias may be neutralized in part by adjusting the coupling ratios of the couplers 902 in the array 900 such that each path through the array 900 has approximately the same insertion loss.

Figure 8B:
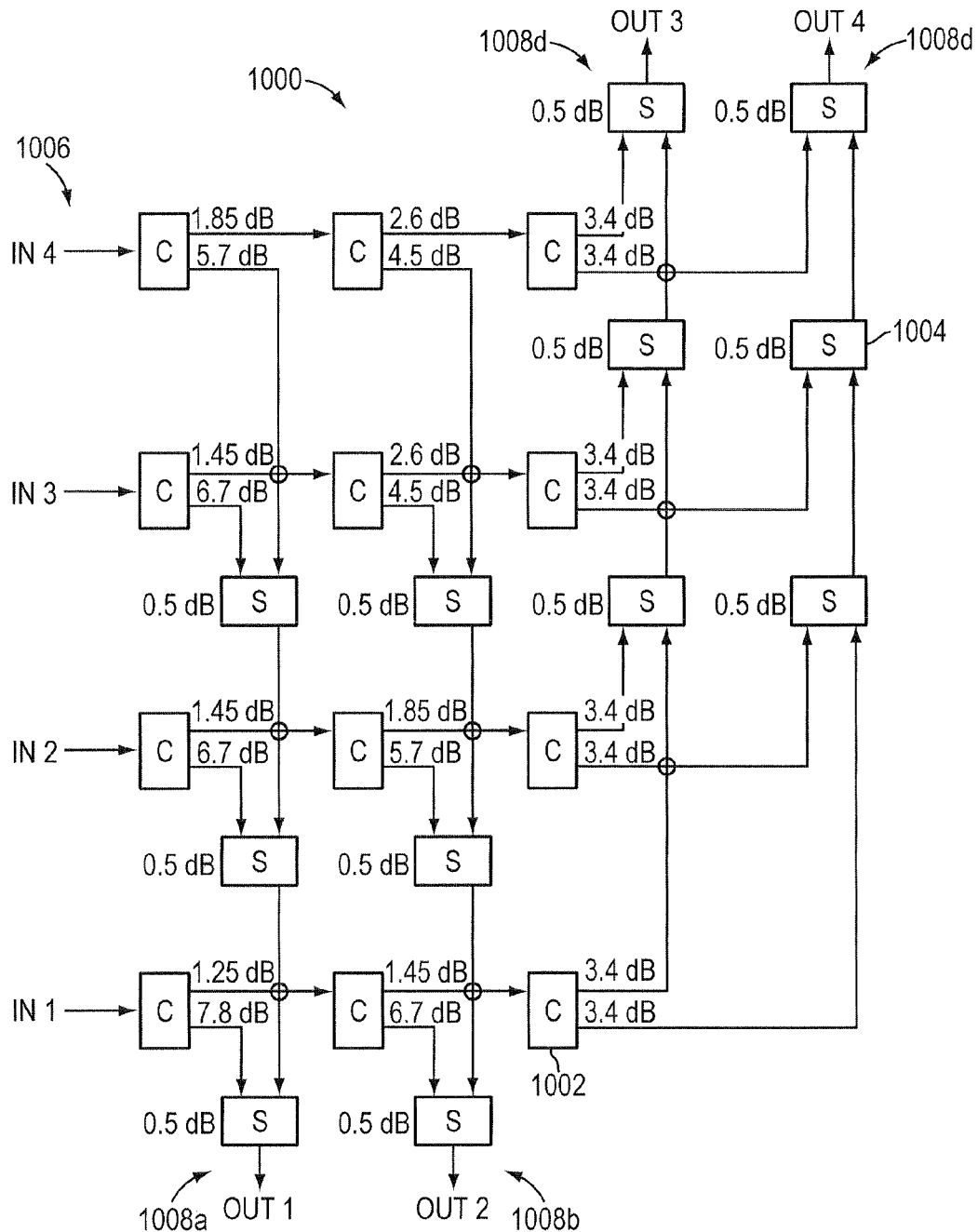

FIG. 8B illustrates an alternative distributed optical multicast switch 1000 made of couplers 1002 and switches 1004. The switch 1000 may be referred to as a split directional distributed optical multicast switch 1000 because all the paths associated with output ports 1008a and 1008b flow in one direction (towards the bottom of the array 1000), while all the paths associated with outputs 1008c and 1008d flow in the opposite direction (towards the top of the array 1000). The switch 1000 attempts to equalize the number of elements a signal traverses from input ports 1006 to output ports 1008a-1008d. For certain switch sizes, equalizing number of elements across the input ports 1006 may limit the insertion loss of the highest insertion loss path through the switch array 1000 to the lowest possible value.

Figure 8C:
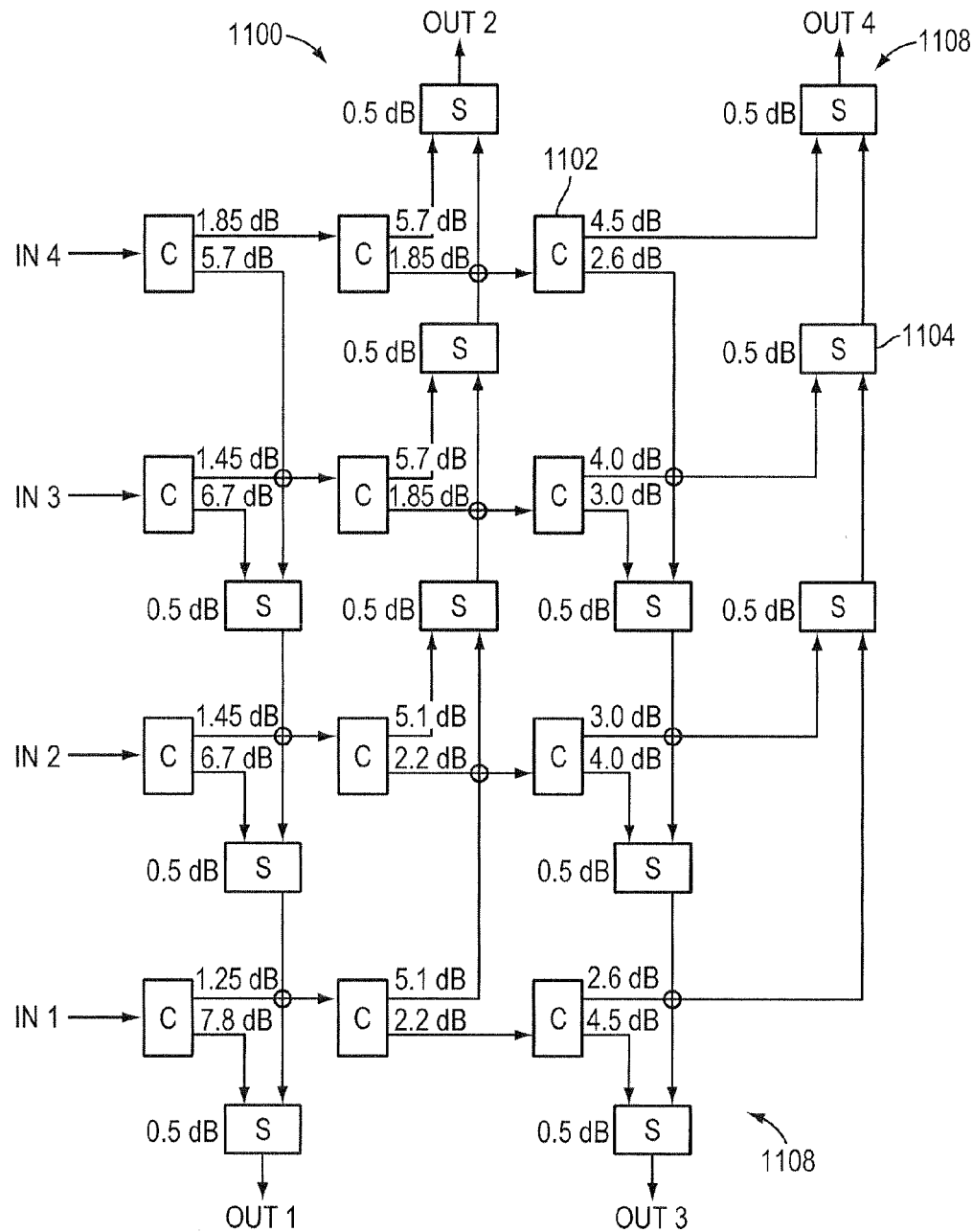

FIG. 8C illustrates a second alternative distributed optical multicast switch 1100 that includes couplers 1102 and switches 1104. The switch 1100 may be referred to as an interleaved distributed optical multicast switch 1100 because the paths associated with adjacent output ports 1108 flow in opposite directions. The switch 1100 provides benefits similar to those of the switch 1000 shown in FIG. 8B, as it also attempts to equalize the number of elements a signal needs to traverse from inputs 1106 to outputs 1108 across the input ports 1108.

The table below lists the average number of optical elements traversed from each input to each output for the distributed multicast switches 900, 1000, and 1100. The split directional and interleaved architectures do a better job of distributing the "number of optical elements traversed" across each input of the switch.

|  | Average Number of Elements Traversed from Input X to Each Output | | | |
| --- | --- | --- | --- | --- |
|  | X = 1 | X = 2 | X = 3 | X = 4 |
| 4 × 4 Unidirectional Distributed Multicast Switch 900 | 3.25 | 4.25 | 5.25 | 5.25 |
| 4 × 4 Split Directional Distributed Multicast Switch 1000 | 4.25 | 4.75 | 4.75 | 4.25 |
| 4 × 4 Interleaved Distributed Multicast Switch 1100 | 4.25 | 4.75 | 4.75 | 4.25 |

Optical Nodes with Multicast and Aggregator Switches

FIG. 9A shows an optical node with three ROADMs 802a-802b (generally, ROADMs 802) and an add/drop routing module 804 that can be used to route signals at the same wavelength to and from the different network node interfaces 803a-803c. In the drop direction, a signal λ1 arrives at network node interface 803a and is routed simultaneously to ROADMs 802b and 802c and the add/drop module 804 via the broadcast capability of the optical coupler in the ROADM 802a, which is associated with network node interface 803a. Similarly, signal λ1' arrives at network node interface 803b and signal λ1" arrives at network node interface 803c and the two signals are routed simultaneously to the other ROADMs 802a-802c and the add/drop module 804 using the ROADMs 803b and 803c. The wavelengths of all three signals (λ1", λ1', and λ1) are identical, although the data content of each signal may be different.

As shown in FIG. 9A, the signals, λ1, λ1', and λ1", arrive at different inputs to the add/drop module and may be accompanied by signals at other wavelengths received at the respective network node interfaces 803a-803c. The signal, λ1', is forwarded to port "In 3" of a distributed multicast switch 806, which may operate as described above with reference to switch 700 of FIG. 4, within the add/drop module 804. The multicast switch 806 forwards the signal, λ1', to a tunable filter 807c connected to a transponder 810c. The tunable filter 807c transmits signals at the wavelength of signal λ1', including signal λ1', to the transponder 810c. The switch 806 also directs signal λ1 to transponder 810a via a tunable filter 807a and signal λ1" to transponders 810b and 810d via tunable filters 807b and 807d, respectively. As can be seen in FIG. 9, the signals do not contend with each other despite being at the same wavelength because contention is prevented by appropriately setting the various switches in the multicast switch 804.

In the add direction, the same signals, λ1, λ1', and λ1", are inputted to an aggregator switch 808 in the add/drop module 804 via transponders 812a, 812c, and 812d, respectively. The switch 808 may operate as described above with reference to switches 730 and 760 in FIGS. 7A and 7B, respectively. Signal λ1 is routed to ROADM 802b by setting switches in the first and second rows of the first column of the aggregator switch 808 to pass signals at the wavelength of signal λ1 to the input of a coupler in second row of the first column of the aggregator switch 808. Similarly, signals λ1' and λ1" are forwarded to the ROADMs 802a and 802c by properly setting switches within the aggregator switch 808.

Because of the isolation provided by the switches within the aggregator switch, the three signals do not contend with one another as they pass through the aggregator switch 808. When the signals arrive at the WSSs in the ROADMs 802a-802c, the WSS devices pass the signals to pass to their respective network node interfaces 803a-803c.

FIG. 9B is a block diagram of an optical node 930 that routes signals λ1, λ1', and λ1" according to alternative embodiments of the present invention. Unlike other nodes, this node 930 can route signals to (from) the transponders from which they originate (are received) without contention. Contention between the signals is avoided because the signals do not reside on same fiber within the node on their paths to the transponders thanks to an add/drop routing module 934 and switches 938, 939 within the ROADMs 932a-932c.

The first signal, λ1, may be generated and received at a transponder 931c connected to a ROADM 932c via tunable filters 936 and optical switches 938 (or optical switch arrays 939) in the ROADM 932c. The switches 938 can be set to route signals within the ROADM 932c or to route signals to an add/drop routing module 934 coupled to other ROADMs 932a and 932b in the same node 930.

Similarly, signal λ1' can be routed from network node interface #2 to the transponder 931b by tuning the middle tunable filter 936 in the ROADM 932c to the wavelength of λ1' and by configuring the switches in the add/drop routing module 934 and the ROADM 932c to direct λ1' from ROADM 932b to transponder 931b. In the reverse direction, signals from transponder #2 can be directed to network node interface #2 by configuring the switches and WSSs appropriately. Signals λ1 and λ1" can be similarly routed to and from network node interface #1 to transponders #1 and #3 by properly configuring the ROADMs 932a-932c and the add/drop routing module 934.

It should be noted that the ROADMs 932a-c can also function as ROADMs containing colorless "directed" add drop ports. Then, if an add/drop routing module 934 is added to the optical node, one or more of the colorless add/drop ports on the ROADMs can operate as colorless/directionless/contentionless add/drop ports.

FIG. 9C is a block diagram of an optical node 960 that routes signals λ1, λ2, and λ3 according to further alternative embodiments of the present invention. Like the node 930 shown in FIG. 9B, the node 960 can route signals between any interface and any transponder without contention. As above, the node 960 includes ROADMs 962a-962c connected to an add/drop routing module 964, which, in turn, is connected to transponders 961. In this case, however, the routing module 964 includes 3:1 switches 968 coupled to the inputs and outputs of the transponders 961. Each switch 968 is coupled to each of the three ROADMs 962a-962c and may be set to transmit (receive) one signal to (from) a respective transponder 961.

FIG. 9C shows that any given transponder 961 can direct its generated signal to any network interface by configuring the corresponding switch 968 to direct the signal from the transponder 961 to the ROADM 962 attached to the desired network node interface. From there, the WSS within the ROADM 962 of the desired network node interface can forward the signal to its corresponding network node interface. Similarly, any given transponder 961 can receive any signal from any network node interface by first going to the ROADM 962 attached to the desired network node interface and tuning the corresponding tunable filter 966 to the wavelength of the desired signal. The corresponding switch 968 in the add/drop routing module 964 is then configured to direct the signal to the given transponder 961.

Wavelength contention is avoided in node 960 because, in the drop direction, the switches 968 within the add/drop routing module 964 prevent contention between three signals at the same wavelength. Similarly, in the add direction, properly setting the switches 968 within the add/drop routing module 964 prevents any contention at the output of the 3:1 couplers within the three ROADMs 962a-962c.

Using the add/drop routing module 964 requires one tunable filter 966 within each ROADM 962 to be dedicated to each transponder 961 attached to the add/drop routing module 964. Therefore, if there are eight transponders and there are eight ROADMs, a total of sixty-four tunable filters is required to direct signals from the transponders 961 to the network node interfaces associated with the ROADMs.

The nodes of FIGS. 9B and 9C differ in the number and placement of optical switches within the nodes. Different configurations may also lead to different numbers and placements of tunable filters within the nodes as well. For example, certain embodiments may include a tunable filter dedicated to each degree, or interface of the node.

Routing Modules with Expansion Modules

Figure 10:
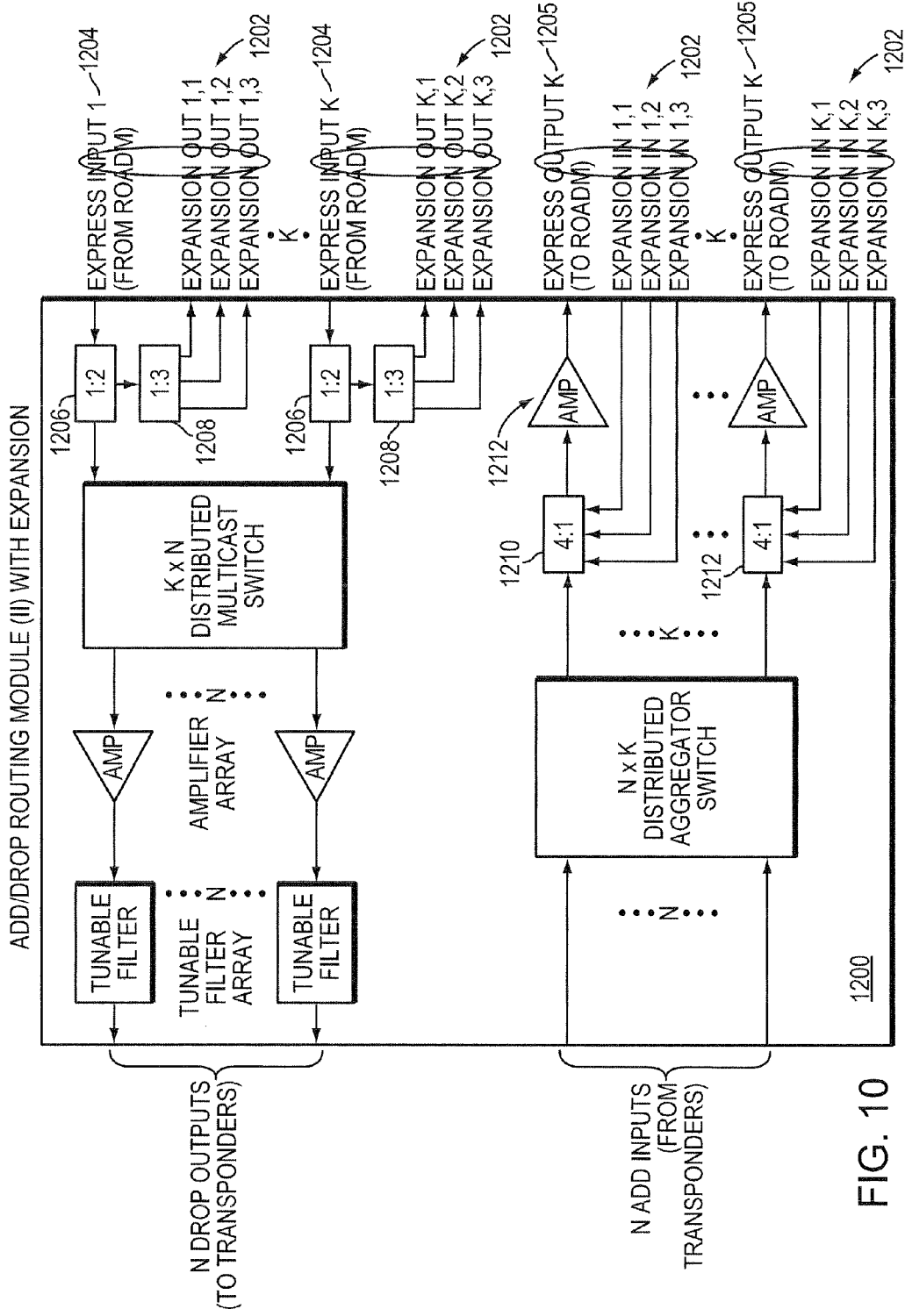
FIG. 10 is a block diagram of an add/drop routing module with expansion ports according to an example embodiment of the present invention.

FIG. 10 illustrates a routing module 1200 with expansion that does not require the use of more than one express port 1204 from each ROADM module in an optical node (not shown). Assume, for instance, that each add/drop routing module in an optical node supports six express ports (K=6) and eight add/drop ports (N=8). Then, the add/drop routing module 1200 (referred to as the "main" add/drop router module) may be used to support the first eight add/drop ports of the node. Up to three "expansion" add/drop router modules could then be attached to the "main" add/drop router module 1200 using the main add/drop module's expansion ports 1202. Although FIG. 10 illustrates three sets of expansion ports, the number of expansion ports can be changed by increasing or decreasing the number of outputs on the 1:3 couplers 1208 on the 4:1 optical couplers 1210.

The main add/drop router module 1200 makes a duplicate copy of signals from the express input ports of the ROADMs, and sends a set of duplicate express ports to each of the expansion add/drop modules. For K=6, each expansion module receives six express input signals from the main add/drop module 1200, and each expansion module sends six express output signals back to the main add/drop module 1200.

Figure 11:
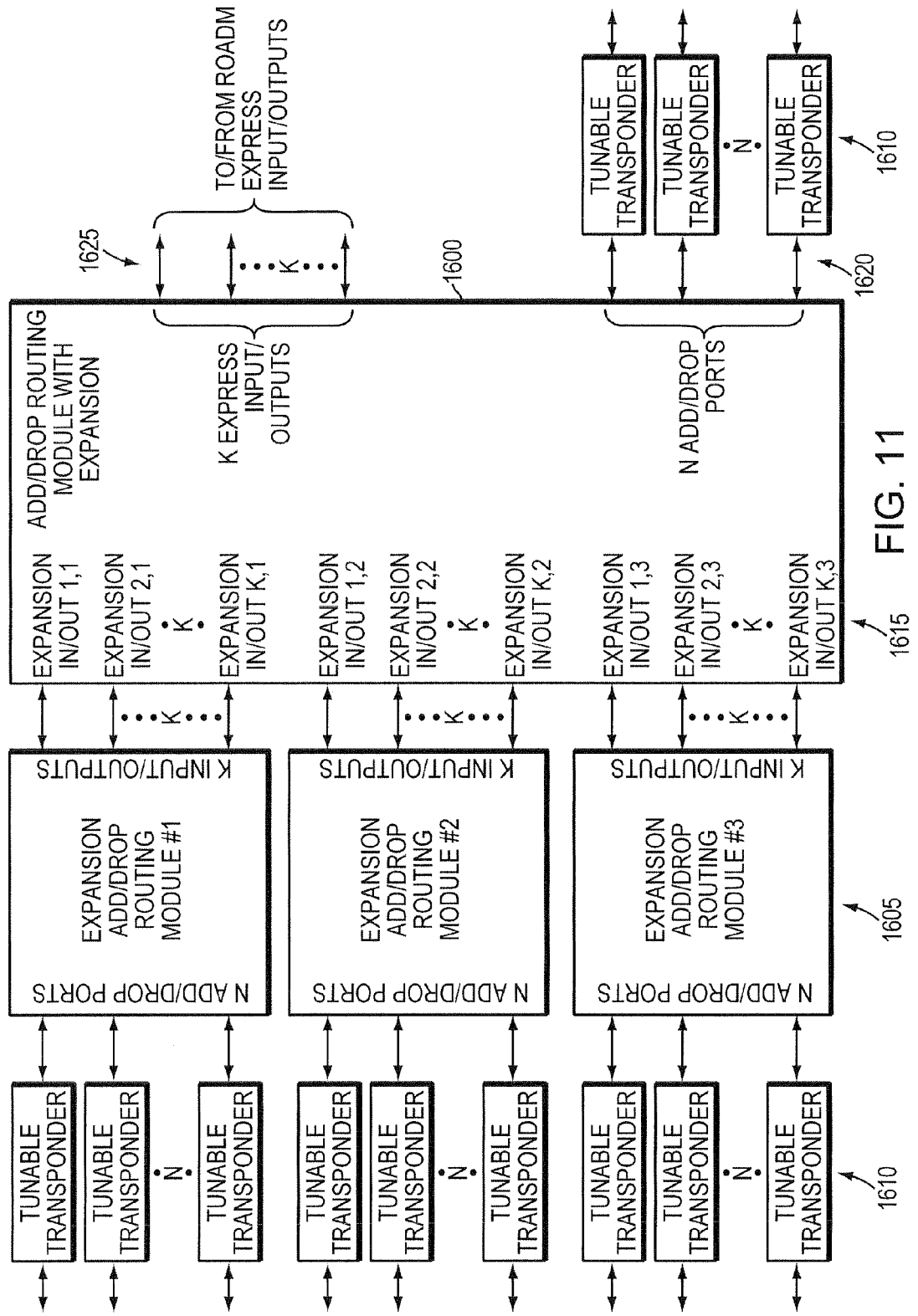
FIG. 11 is a block diagram of an add/drop routing module with expansion ports and three expansion add/drop routing modules according to an example embodiment of the present invention.

FIG. 11 shows a main add/drop routing module 1600 coupled to tunable transponders 1610 via add/drop ports 1620 on three expansion modules 1605. More transponders 1610 are coupled to add/drop ports 1620 on the main add/drop routing module 1600. The main add/drop routing module 1600 is also coupled to ROADMs (not shown) via express input/output ports 1325. Although FIG. 11 illustrates the case of three expansion modules 1605, more or fewer expansion modules 1605 may be used.

Example expansion modules 1605 include the add/drop router modules 600 and 650 shown in FIGS. 3A and 3B, respectively, and may also include amplifiers in the paths of signals being added. When used as expansion modules 1605, the router modules 600 and 650 are coupled to expansion ports 1615 on the main add/drop router module 1200. Specifically, the outputs from the aggregator switches in the expansion modules 1605 are coupled to the expansion input ports of the main add/drop router module 1200. Similarly, the inputs to the multicast switches in the expansion modules 1605 are coupled to the expansion output ports of the main add/drop router module 1200.

For example, in FIG. 10, the signals at ports Expansion Out 1,1 to Expansion Out 6,1 may be sent to the expansion inputs of a first expansion module. The first expansion module sends its six expansion output signals in the reverse direction, i.e., back to the ports Expansion In 1,1 to Expansion In 6,1 on the main add/drop router module. The twelve optical signals running between the main module 1200 and each expansion module (six in each direction), may be transported via a single twelve-fiber parallel ribbon cable.

The add/drop router module 1200 includes all the components of module 650 (FIG. 3B) plus: sets of 1-to-2 optical couplers 1206 and 1-to-3 optical couplers 1208 (used to broadcast the express input signals to each expansion module); 4-to-1 optical couplers 1210 (used to combine the expansion output signals from each expansion module to a single set of express output signals exiting the main module); and an amplifier array 1212 optically coupled between the 4-to-1 optical couplers 1210 and express output ports 1205). The amplifiers 1212 may be used to compensate for insertion loss of the 4-to-1 couplers 1210.

Amplifiers may also be coupled between the couplers 1206 and 1208 and/or before the input of the couplers 1206 to compensate for insertion loss in the couplers 1206 and 1208. As is understood by one skilled in the art of optical nodes, the amplifiers may be used with variable or fixed optical attenuators to achieve desired signal power levels. In addition, other arrangements of amplifiers and couplers may be used to channel signals to and/or from the distributed multicast and aggregator switches. For example, outputs from the aggregator switch can be combined with signals from the expansion ports using couplers whose outputs are amplified and/or attenuated. Likewise, signals from the express inputs can be attenuated and/or amplified, then directed to the multicast switch and corresponding expansion output ports with couplers.

In addition, the coupling ratio, amplification (gain), attenuation, and insertion loss may be chosen to equalize the signal power and/or noise in each signal or to maintain a given OSNR or signal power level as described above. Likewise, the amplifier may be chosen based on the noise figure required to maintain a given OSNR. The signals may also be filtered at the transponders or after amplification to remove background noise, including amplified spontaneous emission noise.

Suitable amplifiers include amplifier arrays constructed using SOAs or arrays of erbium-doped fibers fed by a single pump laser with an array of optical couplers. If necessary, optically pumped amplifiers, such as the aforementioned arrays of erbium-doped fibers, may be pumped by more than one pump laser. Discrete optical amplifiers may be used as well.

Routing Distribution Modules

Figure 12:
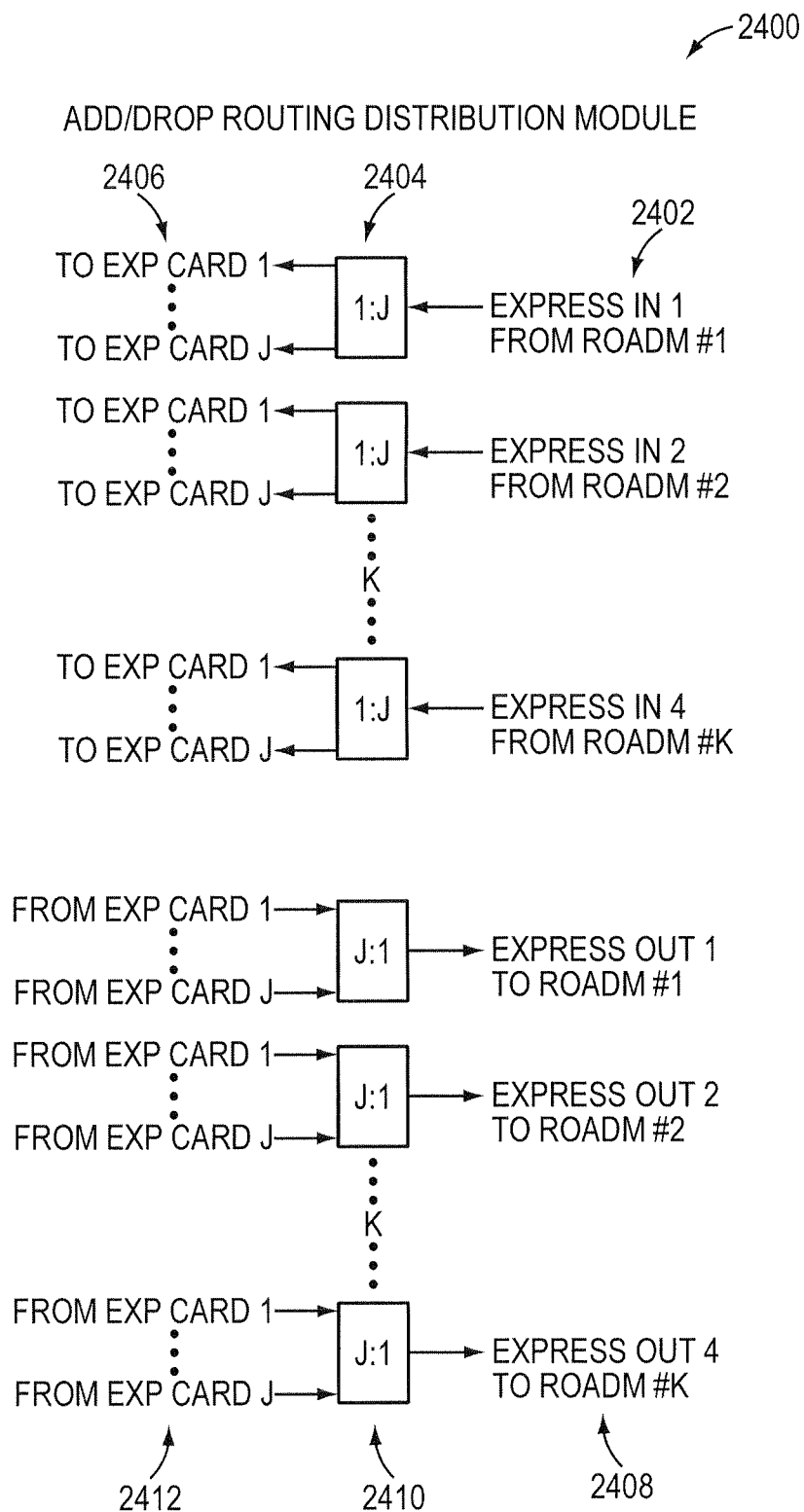
FIG. 12 is a block diagram of an add/drop routing distribution module according to an example embodiment of the present invention.

FIG. 12 is a block diagram of an add/drop routing distribution module 2400. The module 2400 is completely passive (i.e., it requires no electrical power). The module 2400 includes K output optical couplers 2404 and K input optical couplers 2410, where K is a positive integer, and may typically be four or eight. Each coupler may be a 1:J or J:1 coupler, where J is a positive integer. Preferably, J=4, 6, 8, 10, 12, 14, or 16.

The output couplers 2404 may be configured to distribute optical signals from express inputs 2402 to outputs 2406 for expansion cards (not shown). Similarly, the input couplers 2410 may be configured to combine optical signals received via input 2412 optically coupled to expansion cards. The input couplers 2410 may then transmit the combined signals to ROADMs (not shown) via express outputs 2408.

Figure 13:
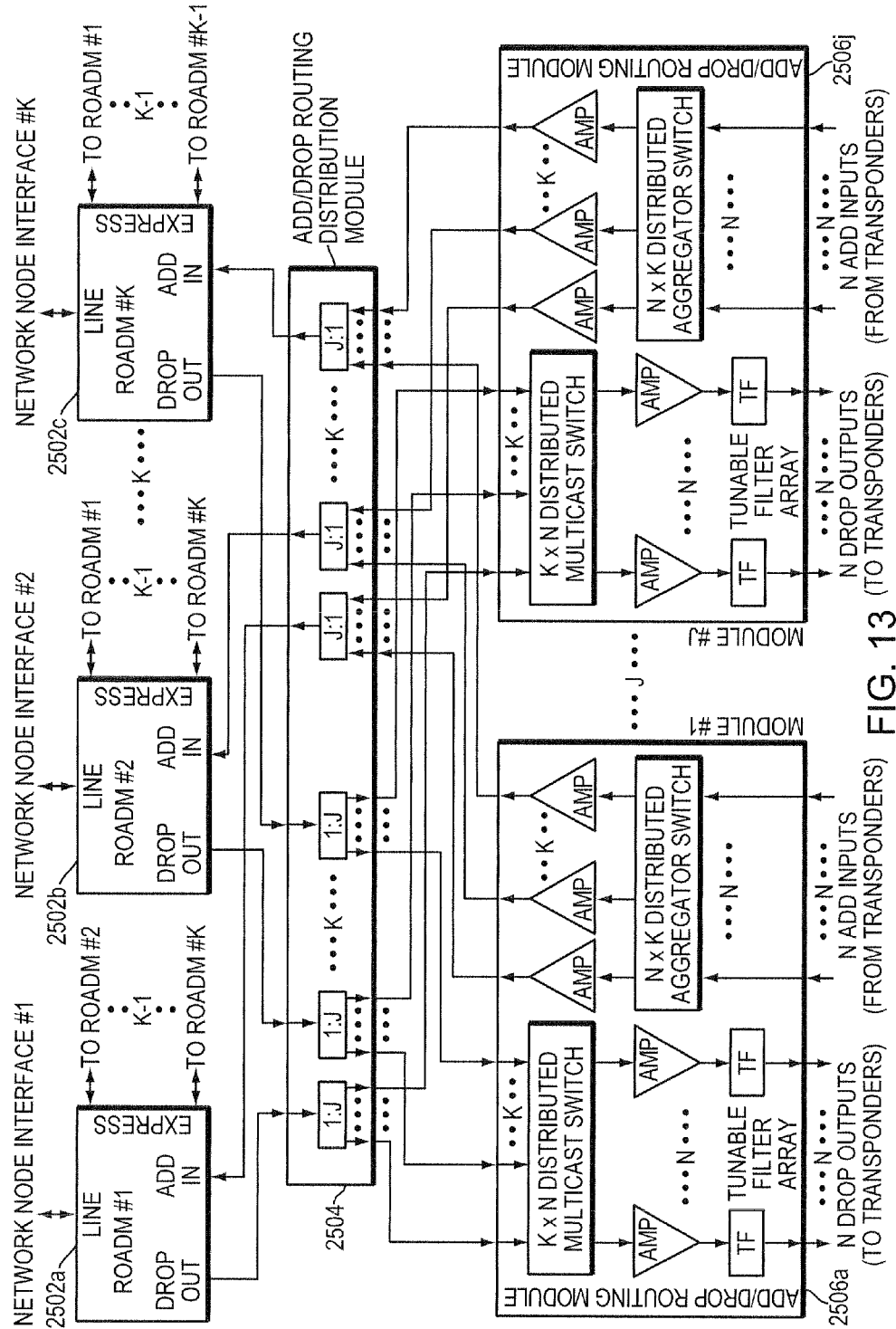
FIG. 13 is a block diagram of multiple ROADMs and multiple add/drop routing modules interconnected with a passive add/drop routing distribution module according to an example embodiment of the present invention.

FIG. 13 shows an optical node 2500 that includes ROADMs 2502a-2502c optically coupled to J routing modules 2506a-2506j via a routing distribution module (mesh card) 2504. As each routing module 2506a-2506j has N add ports and N drop ports, the optical node 2500 has a total of J×N add ports and J×N drop ports, each of which is colorless, directionless, and contentionless, as described above.

In some embodiments, the ROADMs 2502a-2502c may include multiple add and drop ports (created, e.g., by using optical couplers on the ROADMs 2502a-2502c). In these embodiments, multiple distributions modules 2504 may be connected to each ROADM 2502a-2502c (e.g., up to one distribution module 2504 per pair of add/drop ports). Additional distribution modules 2504 may also be coupled to express ports on each ROADM 2502a-2502c.

Figure 14:
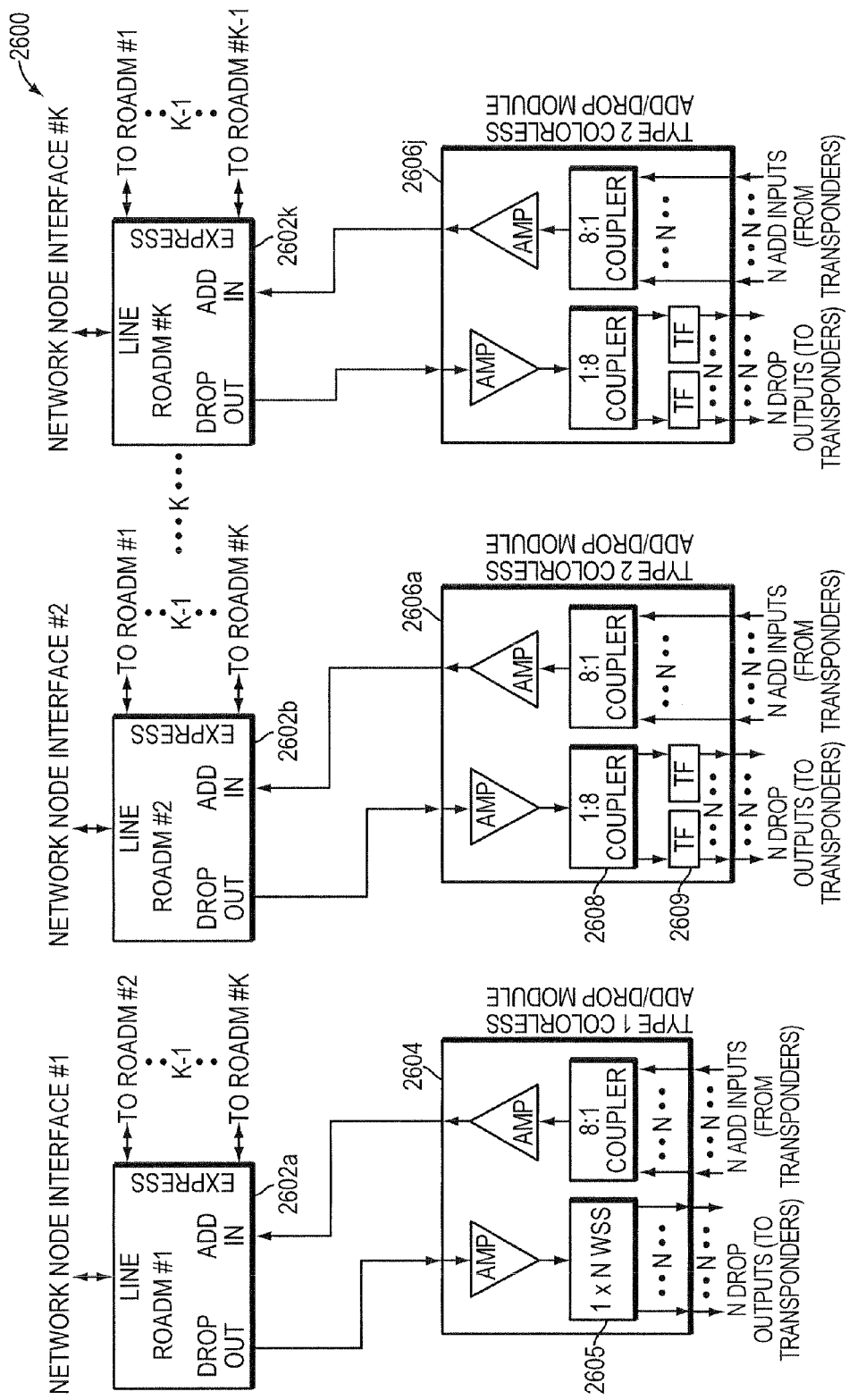
FIG. 14 is a block diagram of multiple ROADMs connected to colorless add/drop modules according to an example embodiment of the present invention.

FIG. 14 shows an alternative optical node 2600 that includes ROADMs 2602a-2602c coupled to different types of add/drop modules 2604, 2606. The first type of add/drop module 2604 includes a WSS and, therefore, can be used to select signals or channels at different wavelengths and may be used to perform colorless adding and dropping to/from a single dedicated network node interface. The second type of add/drop module 2606 includes 1:8 optical couplers 2608 and tunable filters (TF) 2609 and may be used to perform "colorless" adding and dropping.

Since each ROADM 2602a-2602c may include multiple "DROP OUT" and "ADD IN" ports, the ROADM 2602a-2602c can be attached to both colorless add/drop modules and add/drop routing distribution modules (attached to add/drop routing modules) to provide both colorless add/drop ports and colorless, directionless, contentionless add/drop ports in the same network node. In addition, colored add/drop ports may also be simultaneously attached to the ROADM modules 2602a-2602c via a the "DROP OUT" and "ADD IN" ports. This may be done, for instance, by attaching a module containing AWGs to the "DROP OUT" and "ADD IN" ports of the ROADMs 2602a-2602c.

Figure 15:
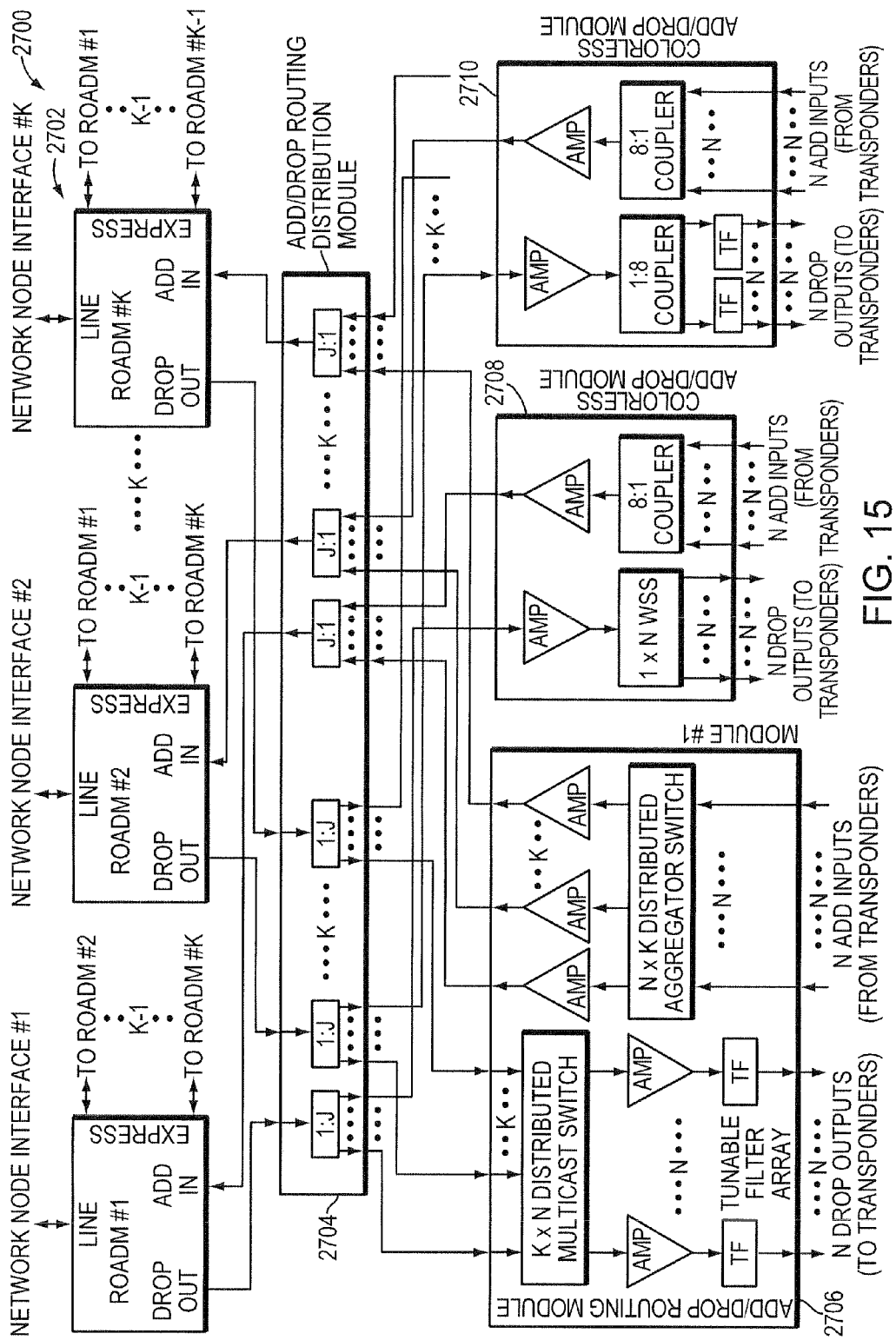
FIG. 15 is a block diagram of multiple ROADMs connected to colorless add/drop modules and colorless, directionless add/drop modules via a passive add/drop routing distribution module according to an alternative embodiment of the present invention.

FIG. 15 is a block diagram of a node 2700 according to yet another alternative embodiment of the present invention. The node 2700 includes features of the nodes 2500 and 2600 shown in FIGS. 13 and 14. In particular, the node 2700 includes ROADMs 2702 optically connected to an add/drop routing distribution module 2704, which, in turn, is optically connected to one or more colorless modules 2708, 2710 that operate as described above with reference to FIG. 14. The add/drop routing distribution module 2704 is also optically connected to one or more colorless, directionless modules 2706 that operates as above with reference to FIG. 13.

On the configurations of FIGS. 13-15, the tunable filters could be removed from the add/drop routing modules and colorless add/drop modules and instead placed on the transponder modules. Alternatively, on both the FIG. 13 and FIG. 14 configurations, the tunable filters could be removed from the add/drop routing modules, and then on the transponder modules individual signals could be filtered out for processing via digital signal processing (DSP) techniques. As an example, coherent detection could be used to recover a WDM signal, and further DSP processing could be used to filter out a selectable individual wavelength. The content of the individual signal would then be passed out of the client output of the transponder.

Figure 16:
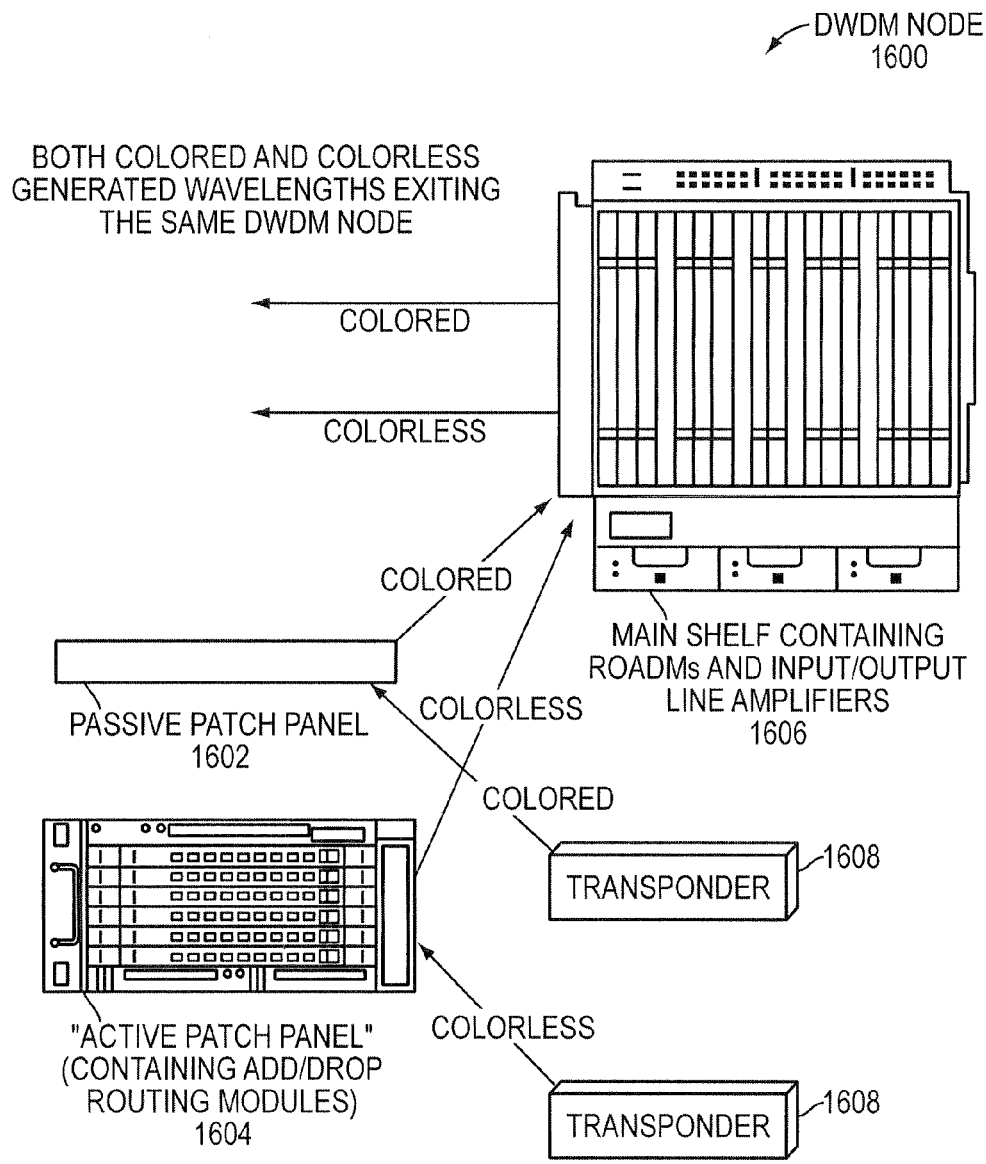
FIG. 16 is a diagram of a DWDM node with active and passive patch panels according to an example embodiment of the invention.

FIG. 16 is a schematic diagram that illustrates the use of passive patch panels 1602 and active patch panels 1604 in simultaneous support of both colored/directed add/drop ports and colorless/directionless/contentionless add/drop ports within a single DWDM node 1600. In FIG. 16, the node 1600 includes a main shelf 1604 that holds ROADMs, amplifiers, and, optionally, transponder modules 1608. Additional shelves may be used to hold additional transponder modules 1608.

For each degree (interface) of the node, one or more passive patch panels 1602 is used to passively multiplex and demultiplex the signals associated with the transponders 1608 used to provide the colored/directed add/drop ports. Each patch panel 1602 includes one or more athermal AWGs. Passive patch panels 1602 do not require electrical power in order to operate.

The DWDM node 1600 may also include one or more active patch panels 1604. Each active patch panel 1604 may be used to support one or more add/drop routing modules and one or more expansion add/drop routing modules. Active patch panels 1604 typically require electrical power in order to operate. Active patch panels 1604 may be in the form of a compact shelf that supports multiple add/drop routing modules and expansion add/drop routing modules, which slide into slots on the shelf.

Transponder modules 1608 connect directly to both the active and passive patch panels 1602, 1604 using optical cables. The same types of transponders 1608 may be used for both types of patch panels 1602, 1604. Both patch panel types 1602, 1604 may be connected to the ROADMs within the main shelf 1606 using the same input/output ports on the ROADM modules (e.g., express ports or dedicated add/drop ports).

Colorless/directionless/contentionless add/drop ports may be added hitlessly to nodes 1600 by simply populating one or more add/drop routing modules and connecting the add/drop routing modules to either the dedicated add/drop ports on the ROADM modules or the express ports on the ROADM modules.

While this invention has been particularly shown and described with references to example embodiments thereof, it will be understood by those skilled in the art that various changes in form and details may be made therein without departing from the scope of the invention encompassed by the appended claims.

What is claimed is:

1. An optical node, comprising:
   at least two reconfigurable optical add/drop multiplexers (ROADMs) configured to transmit or receive respective wavelength division multiplexed (WDM) signals, each WDM signal including multiple signals of different wavelengths, onto or from at least two internode network paths; and
   a routing module, coupled to at least a subset of the at least two ROADMs, configured to direct distinct signals of the same wavelength, simultaneously, to different internode network paths;
   wherein each ROADM includes a wavelength-selective switch (WSS), wherein a signal to be added is directed to a WSS from an add/drop port via an intranode network path, and wherein a signal received at a ROADM via an internode network path is directed via an optical path to a respective WSS on another ROADM.

2. The optical node of claim 1, wherein each ROADM includes a wavelength-selective switch (WSS), and wherein a signal to be added is directed to a WSS from an add/drop port via intranode network paths.

3. The optical node of claim 1, wherein each ROADM includes a wavelength-selective switch (WSS), and wherein a signal received at a first ROADM via an internode network path is directed via an optical path to a respective WSS on another ROADM.

4. The optical node of claim 1, wherein the optical node includes multiple routing modules, coupled to the at least a subset of the at least two ROADMs, and wherein a routing module, among the multiple routing modules, includes at least one expansion port to couple at least one ROADM, of the subset of ROADMs, optically to at least one other routing modules.

5. The optical node of claim 1, wherein at least two reconfigurable optical add/drop multiplexers (ROADMs) are configured to transmit and receive respective wavelength division multiplexed (WDM) signals.

6. An optical node, comprising:
at least two reconfigurable optical add/drop multiplexers (ROADMs) configured to transmit or receive respective wavelength division multiplexed (WDM) signals, each WDM signal including multiple signals of different wavelengths, onto or from at least two internode network paths; and
a routing module, coupled to at least a subset of the at least two ROADMs, configured to direct distinct signals of the same wavelength, simultaneously, to different internode network paths;
wherein the routing module includes:
an add component optically coupled to a bank of add ports and configured to direct add signals to the at least a subset of the at least two ROADMs; and
a drop component optically coupled to a bank of drop ports and configured to direct drop signals to drop ports among the bank of drop ports.

7. The optical node of claim 6, wherein the drop component includes or is coupled to a bank of tunable filters.

8. An optical node, comprising:
at least two reconfigurable optical add/drop multiplexers (ROADMs) configured to transmit or receive respective wavelength division multiplexed (WDM) signals, each WDM signal including multiple signals of different wavelengths, onto or from at least two internode network paths; and
a routing module, coupled to at least a subset of the at least two ROADMs, configured to direct distinct signals of the same wavelength, simultaneously, to different internode network paths;
wherein the routing module is a colorless routing module including colorless add/drop ports.

9. An optical node, comprising:
at least two reconfigurable optical add/drop multiplexers (ROADMs) configured to transmit or receive respective wavelength division multiplexed (WDM) signals, each WDM signal including multiple signals of different wavelengths, onto or from at least two internode network paths; and
a routing module, coupled to at least a subset of the at least two ROADMs, configured to direct distinct signals of the same wavelength, simultaneously, to different internode network paths;
wherein the routing module includes (i) at least one multicast switch configured to route any drop signal to at least one drop port and (ii) at least one aggregator switch configured to route any add signal to at least one ROADM.

10. The optical node of claim 9, wherein the routing module further includes at least one tunable filter configured to filter signals directed to the at least one drop port.

11. The optical node of claim 10, wherein the routing module further includes at least one optical amplifier configured to amplify signals directed to the at least one drop port.

12. The optical node of claim 9, wherein the routing module further includes optical amplifiers configured to amplify output signals of the at least one aggregator switch.

13. An optical node, comprising:
at least two reconfigurable optical add/drop multiplexers (ROADMs) configured to transmit or receive respective wavelength division multiplexed (WDM) signals, each WDM signal including multiple signals of different wavelengths, onto or from at least two internode network paths; and
a routing module, coupled to at least a subset of the at least two ROADMs, configured to direct distinct signals of the same wavelength, simultaneously, to different internode network paths;
wherein the optical node includes multiple routing modules, coupled to the at least a subset of the at least two ROADMs, and a distribution module optically coupling the at least two ROADMs to the multiple routing modules.

14. The optical node of claim 13, wherein the at least two ROADMs are coupled to the distribution module via corresponding add/drop ports.

15. The optical node of claim 13, wherein the at least two ROADMs are coupled to the distribution module via corresponding express ports.

16. A method of routing wavelength division multiplexed (WDM) signals, comprising:
transmitting or receiving WDM signals, each WDM signal including multiple signals of different wavelengths, onto or from at least two internode network paths using at least two reconfigurable optical add/drop multiplexers (ROADMs); and
directing, by a routing module coupled to at least a subset of the at least two ROADMs, signals to different internode network paths, simultaneously, the directed signals include distinct signals of the same wavelength;
wherein directing signals includes directing a signal to be added to a wavelength-selective switch (WSS) in a ROADM from an add/drop port via an optical intranode network path to a WSS on another ROADM.

17. The method of claim 16, wherein directing signals includes directing a signal to be added to a wavelength-selective switch (WSS) in one of the at least two ROADMs from add/drop port via intranode network paths.

18. The method of claim 16, wherein directing signals includes directing signals received at a ROADM via an internode network path to a wavelength-selective switch on another ROADM via optical paths.

19. The method of claim 16, further including:
adding signals to or dropping signals from the WDM signals.

20. The method of claim 19, wherein dropping the signals from the WDM signals includes filtering signals to be dropped with tunable filters included in or optically coupled to the routing module.

21. The method of claim 19, wherein filtering signals includes filtering a signal associated with a colorless drop port with a tunable filter dedicated to a particular interface of the optical node.

22. A method of routing wavelength division multiplexed (WDM) signals, comprising:
transmitting or receiving WDM signals, each WDM signal including multiple signals of different wavelengths, onto or from at least two internode network paths using at least two reconfigurable optical add/drop multiplexers (ROADMs); and
directing, by a routing module coupled to at least a subset of the at least two ROADMs, signals to different internode network paths, simultaneously, the directed signals include distinct signals of the same wavelength;
wherein directing signals includes (i) routing drop signals to drop ports using a multicast switch and (ii) routing add signals using an aggregate switch to at least one ROADM, of the at least a subset of the at least two ROADMs, the routed drop signals or the routed add signals include at least two distinct signals of the same wavelength.

23. The method of claim 22, wherein routing the drop signals includes filtering the drop signals routed to drop ports.

24. The method of claim 23, wherein routing the drop signals includes amplifying the drop signals routed to drop ports.

25. The method of claim 22, wherein routing the add signals includes amplifying output signals of the aggregator switch.

26. A method of routing wavelength division multiplexed (WDM) signals, comprising:
transmitting or receiving WDM signals, each WDM signal including multiple signals of different wavelengths, onto or from at least two internode network paths using at least two reconfigurable optical add/drop multiplexers (ROADMs); and
directing, by a routing module coupled to at least a subset of the at least two ROADMs, signals to different internode network paths, simultaneously, the directed signals include distinct signals of the same wavelength;
wherein directing the signals, by the routing module, includes directing the signals through a distribution module optically coupling the routing module to the at least a subset of the at least two ROADMs.

27. The method of claim 26, wherein the at least a subset of the at least two ROADMs is coupled to the distribution module via a corresponding plurality of add/drop ports.

28. The method of claim 26, wherein the at least a subset of the at least two ROADMs are coupled to the distribution module via a corresponding plurality of express ports.

29. A method of routing wavelength division multiplexed (WDM) signals, comprising:
transmitting or receiving WDM signals, each WDM signal including multiple signals of different wavelengths, onto or from at least two internode network paths using at least two reconfigurable optical add/drop multiplexers (ROADMs); and
directing, by a routing module coupled to at least a subset of the at least two ROADMs, signals to different internode network paths, simultaneously, the directed signals include distinct signals of the same wavelength;
wherein the routing module includes at least one expansion port to couple at least one ROADM, of the at least a subset of the at least two ROADMS, optically to one or more other routing modules and wherein directing signals further includes directing signals from the one or more ROADMs to the one or more other routing modules through the at least one expansion port.

* * * * *